United States Patent
Kuo et al.

(10) Patent No.: US 6,400,471 B1
(45) Date of Patent: Jun. 4, 2002

(54) FLEXIBLE ARCHITECTURE FOR IMAGE PROCESSING

(75) Inventors: David Kuo; Eric Anderson, both of San Jose, CA (US)

(73) Assignee: FlashPoint Technology, Inc., Peterborough, NH (US)

(*) Notice: Subject to any disclaimer, the term of this patent is extended or adjusted under 35 U.S.C. 154(b) by 0 days.

(21) Appl. No.: 09/249,741

(22) Filed: Feb. 11, 1999

(51) Int. Cl.[7] .................................................. H04N 1/32
(52) U.S. Cl. ........................ 358/468; 358/442; 348/231
(58) Field of Search ................................. 358/468, 442, 358/444, 404, 448, 909.1; 348/207, 552, 231, 233, 14.08; 709/100, 104

(56) References Cited

U.S. PATENT DOCUMENTS

| | | | | |
|---|---|---|---|---|
| 5,477,264 A | * | 12/1995 | Sarbadhikari et al. | 348/231 |
| 5,635,983 A | * | 6/1997 | Ohmori | 358/909.1 |
| 5,987,223 A | * | 11/1999 | Narukawa et al. | 358/448 |
| 6,003,093 A | * | 12/1999 | Kester | 709/321 |
| 6,169,725 B1 | * | 1/2001 | Gibbs et al. | 348/552 |
| 2001/0014968 A1 | * | 8/2001 | Mohammed | 717/11 |
| 2001/0049758 A1 | * | 12/2001 | Shigetomi et al. | 710/74 |

\* cited by examiner

*Primary Examiner*—Kimberly A. Williams
(74) *Attorney, Agent, or Firm*—Sawyer Law Group LLP

(57) ABSTRACT

A system and a method for processing image data in a digital image device such as a digital camera. The present invention includes a bus, a central processing unit coupled to the bus, an image processing subsystem coupled to the central processing unit for processing the image data using a particular processing mode, a memory unit coupled to the bus, and a data storage element for storing the image data after image processing. The memory unit has stored therein an operating system for managing the image processing subsystem, and the memory unit also has a data structure for managing the image data for the image processing subsystem during image processing. The data structure provides an interface between the operating system and the image processing subsystem, such that the operating system is independent of the processing mode used by the image processing subsystem.

30 Claims, 15 Drawing Sheets

100

100

FLEXIBLE ARCHITECTURE FOR IMAGE PROCESSING

FIELD OF THE INVENTION

The present invention relates to the field of digital cameras, and more particularly relates to a platform-independent image processing architecture.

BACKGROUND OF THE INVENTION

Digital image devices, such as but not limited to digital cameras, are an increasingly popular means for capturing images (in other words, for taking pictures) and for processing the resulting image data.

In digital cameras, images are represented by data and stored either in the camera's memory or an external memory device from which they can be accessed by a user. A significant advantage to digital cameras is that users then have the capability to manipulate the image data in a number of ways. Users are able to operate on and modify the images, transfer them to other devices, incorporate them into documents, display them in a variety of formats, and the like. Thus, in comparison to conventional cameras, digital cameras introduce a variety of capabilities and enhancements.

The digital camera incorporates a central processing unit, memory, and many other features of a computer system. Accordingly, the digital camera is capable of concurrently running multiple software routines and subsystems to control and coordinate the various processes of the camera. One subsystem of particular interest is the image processing subsystem that is used for analyzing and manipulating captured image data in a variety of ways, including linearization, defect correction, white balance, interpolation, color correction, image sharpening, and color space conversion. In addition, the subsystem typically coordinates the functioning and communication of the various image processing stages and handles the data flow between the various stages.

A problem exists in that there are many prior art makes and models of digital cameras incorporating different hardware components and software configurations (that is, "platforms") for image processing. One make of digital camera may utilize a software mode for image processing, another may implement a hardware mode, and others may implement a mode utilizing various degrees of hardware and software combinations. Typically, this problem is addressed in the prior art by employing an operating system written specifically for the image processing mode used by the particular digital camera platform.

However, this prior solution is problematic because an operating system designed for one digital camera platform is generally too specialized to function on another platform. Even in those cases where the image processing mode for one camera make/model shares a common aspect with another make/model, it is often not possible to utilize a common operating system because of their specialized natures.

Consequently, in the prior art it is necessary for manufacturers of digital cameras to, for example, develop, purchase or license more than one version of a digital camera operating system, e.g., one version for each type of digital camera platform that the manufacturer offers. As the manufacturer develops additional makes and models employing various image processing modes, it is likely that different operating systems will also be needed. The need to integrate the development of the operating system with the development of the image processing mode introduces difficulties that could extend the lead time for introduction of a new product. For a manufacturer wishing to offer a number of different models of digital cameras, this can result in substantial effort and expense.

Similarly, the expense to a vendor of operating systems is also increased due to the need to support multiple digital camera platforms. In the prior art, different versions of operating systems increase development and manufacturing costs. The number of programmers needed to develop and support different operating systems is clearly a function of the number of operating systems that need to be provided. Increased costs are also associated with the support of multiple versions; for example, upgrades must be prepared for each version, and separate users manuals must also be written and published.

Accordingly, it is desirable to provide an operating system and/or method that can be utilized with the image processing mode used by any digital camera platform. It is also desirable that the operating system and/or method be flexible enough to be adapted to foreseeable digital camera platforms. The present invention provides a novel solution to the above needs.

SUMMARY OF THE INVENTION

The present invention provides an operating system that can be utilized with the image processing mode on any digital camera platform. The present invention is also flexible enough to be adapted to foreseeable digital camera platforms.

The present invention is a system and a method for processing image data in a digital image device such as a digital camera. The present invention includes a bus, a central processing unit coupled to the bus, an image processing subsystem coupled to the central processing unit for processing the image data using a particular processing mode, a memory unit coupled to the bus, and a data storage element for storing the image data after image processing. The memory unit has stored therein an operating system for managing the image processing subsystem, and the memory unit also has a data structure for managing the image data for the image processing subsystem during image processing. The data structure provides an interface between the operating system and the image processing subsystem, such that the operating system is independent of the processing mode used by the image processing subsystem.

In the present embodiment, the present invention also includes a spooler element for transferring the image data into the data structure, a data line reader element for reading the image data from the spooler element, and a data line writer element for writing the image data to the data storage element. The data line writer element provides an interface between the image processing subsystem and the data storage element that is independent of the processing mode used by the image processing subsystem.

In one embodiment, the processing mode used by the image processing subsystem includes a plurality of image processing modules and a JPEG (Joint Photographic Experts Group) software element. In another embodiment, the processing mode used by the image processing subsystem includes a digital signal processor and a JPEG hardware element. In yet another embodiment, the processing mode used by the image processing subsystem includes an image processing hardware system.

In the present embodiment, the present invention implements a method for processing image data in a digital image device that includes the following steps: a) creating a data structure corresponding to the image processing mode used by the image processing subsystem; b) initializing the spooler element; c) initializing the data line reader element; d) initializing the data line writer element; e) initializing the image processing subsystem and the data structure; f) forwarding the image data to the data structure using the spooler element; g) processing the image data using the processing mode used by the image processing subsystem; and h) writing the image data to the data storage element.

The present invention thus provides a flexible architecture for image processing within a digital image device (e.g., digital camera). The present invention permits the use of different modes of image processing while maintaining the same operating system, application program and application program interface. That is, the image processing mode used in a particular digital camera platform is invisible to the operating system and to the application program. The present invention accomplishes this by defining data structures that are flexible enough that different imaging processing subsystems can be implemented without affecting the software/hardware architecture that surrounds the subsystem. The data structures provide a well-defined interface for entering and exiting the image processing subsystem without changing or perturbing the upstream and downstream elements of the digital camera.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The present invention is illustrated by way of example and not by way of limitation, in the figures of the accompanying drawings in which like reference numerals refer to similar elements and in which.

DETAILED DESCRIPTION OF THE INVENTION

Figure 1:
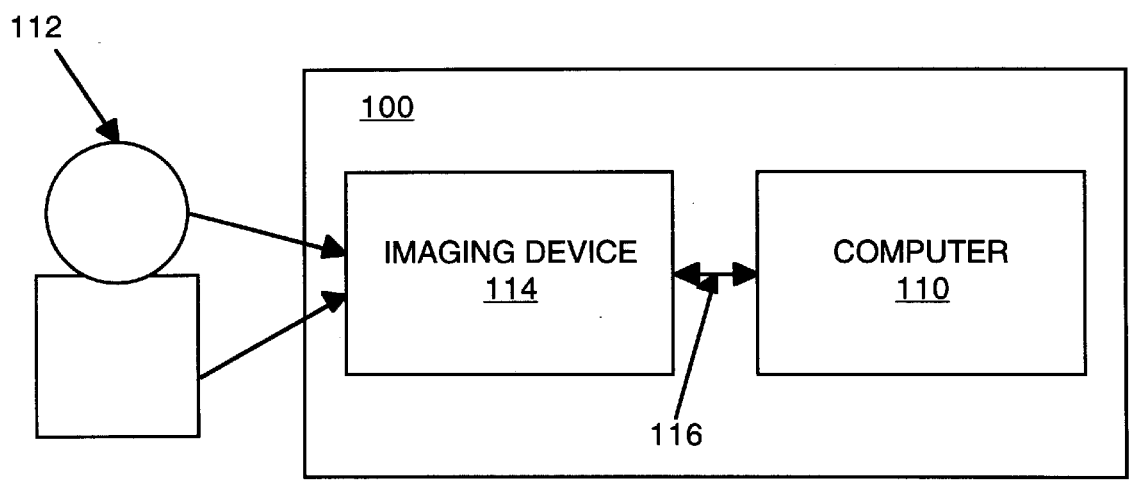
FIG. 1 is a block diagram exemplifying a digital camera in accordance with one embodiment of the present invention.

The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any digital image device which processes, displays and/or prints digital images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components and circuits have not been described in detail as not to unnecessarily obscure aspects of the present invention.

The present invention is an image processing architecture that is designed to input a large amount of image data from a data store, operate upon that data, and output the processed data to another data store. The actual processing may be performed by either software components, hardware components, or combinations of the two. The present invention is implemented in a digital camera operating system such as the Digita™ Operating Environment (OE) by FlashPoint Technology of San Jose, Calif.

In the Digita OE, the data store may either be in memory or on disk. The exact nature of the data store can be hidden from the processing module by using a well designed programming interface. From the perspective of the Digita OE, data from either form can be delivered to the processing module in a well described manner, which does not require any software changes.

For software components, the desire is to retrieve data into a buffer that can be referenced by the processing module. To accomplish this, the programming interface provides a routine that can be called to retrieve data from the data store. In the case of when the data store is in memory, this routine would copy the requested bytes of data from the data store memory into a memory buffer that can be referenced by the processing module. In the case of when the data store is on disk, this would read the data off disk into a memory buffer that can be referenced by the processing module.

For hardware components, the desire is to retrieve data through a direct memory access (DMA) operation, where data are transferred across a bus by hardware. To support this mode, the programming interface provides a routine that can be called to retrieve a pointer to a buffer that contains the data. In the case of when the data store is in memory, this routine would simply return the address of the data store memory. In the case of when the data store is on disk, this routine would allocate a buffer, and read the data from disk into the newly allocated buffer, then return the address of the newly allocated buffer.

Combinations of hardware and software components are compatible with this design. The key point is for the processing module to identify whether it will be accessing data through the functional interface or through a pointer to memory. The Digita OE can respond to both types of requests without requiring any software changes.

Refer to FIG. 1, which is a block diagram of one embodiment of digital camera 100 for use in accordance with the present invention. Digital camera 100 preferably comprises imaging device 114, system bus 116 and computer 110. Imaging device 114 includes an image sensor, such as a charged coupled device (CCD) or a complementary metal-oxide semiconductor (CMOS) sensor, for generating a set of raw image data representing a captured image of an object or person (e.g., object 112).

Figure 2:
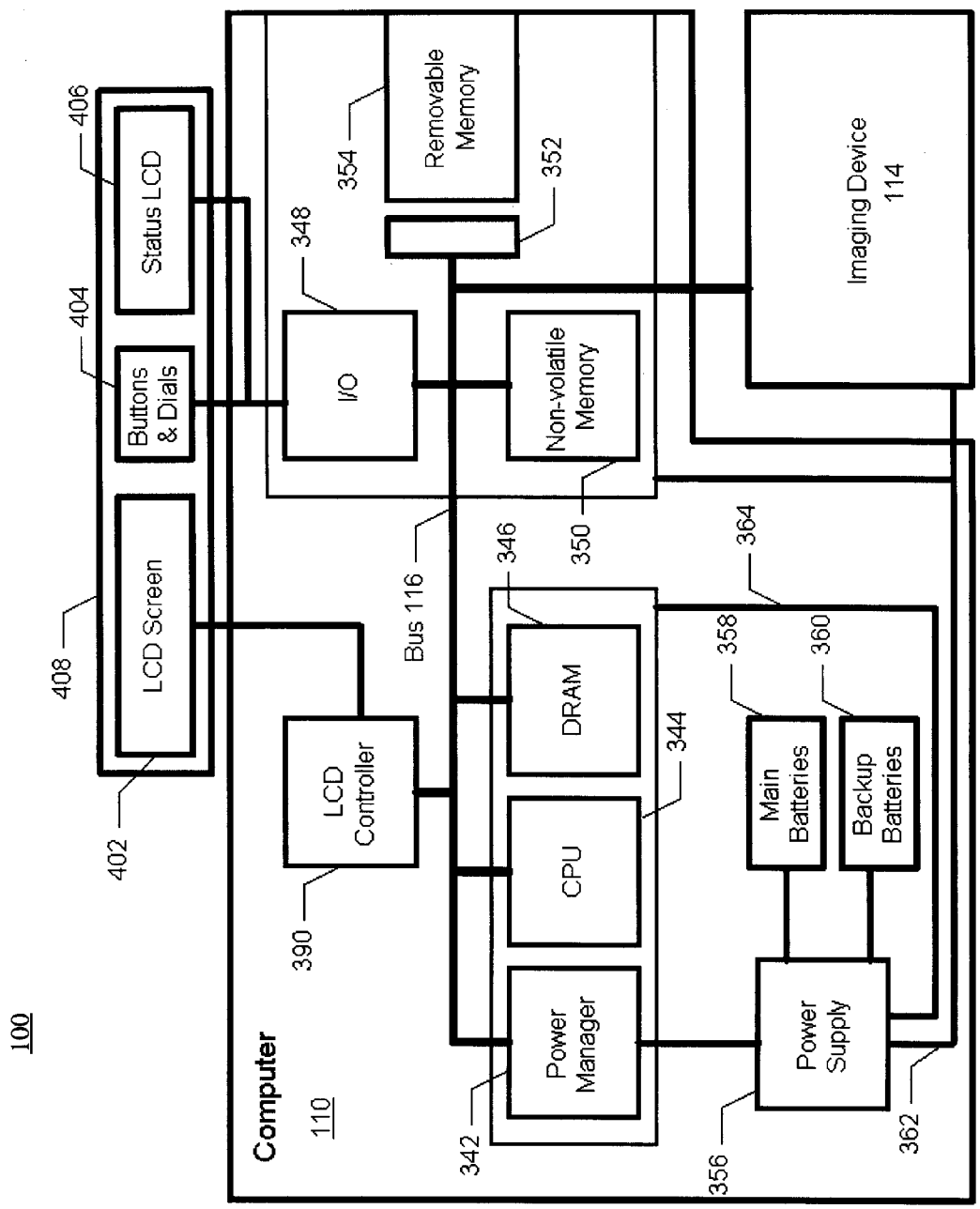
FIG. 2 is a block diagram exemplifying the computer system used in a digital camera in accordance with one embodiment of the present invention.

With reference now to FIG. 2, system bus 116 provides connection paths between imaging device 114, optional power manager 342, central processing unit (CPU) 344, dynamic random-access memory (DRAM) 346, input/output interface (I/O) 348, non-volatile memory 350, and buffers/connector 352 that connect optional removable memory 354 to system bus 116.

CPU 344 may include a conventional processor device for controlling the operation of digital camera 100. In the preferred embodiment, CPU 344 is capable of concurrently running multiple software routines to control the various processes of digital camera 100 within a multi-threaded environment. For example, images may be captured at the same time that previously captured images are processed in the background to effectively increase the capture rate of the camera. In a preferred embodiment, CPU 344 runs an operating system capable of providing a menu-driven graphical user interface (GUI) and software image processing. An example of such software is the Digita™ Operating Environment by FlashPoint Technology of San Jose, Calif.

Continuing with reference to FIG. 2, I/O 348 is an interface device allowing communications to and from computer 110. For example, I/O 348 permits an external host computer (not shown) to connect to and communicate with computer 110. I/O 348 also interfaces with a plurality of buttons and/or dials 404 and optional status liquid crystal display (LCD) 406 which, in addition to LCD screen 402, are the hardware elements of the digital camera's user interface 408.

Non-volatile memory 350, which may typically comprise a conventional read-only memory or flash memory, stores a set of computer-readable program instructions to control the operation of digital camera 100. Removable memory 354 serves as an additional image data storage area and is preferably a non-volatile device, such as a Flash disk, that is readily removable and replaceable by the user of digital camera 100 via buffers/connector 352.

With reference still to FIG. 2, power supply 356 supplies operating power to the various components of digital camera 100. Power manager 342 communicates via line 366 with power supply 356 and coordinates power management operations for digital camera 100. In the preferred embodiment, power supply 356 provides operating power to main power bus 362 and also to secondary power bus 364. Main power bus 362 provides power to imaging device 114, I/O 348, non-volatile memory 350 and removable memory 354. Secondary power bus 364 provides power to power manager 342, CPU 344 and DRAM 346.

Power supply 356 is connected to main batteries 358 and also to backup batteries 360. In the preferred embodiment, a user of digital camera 100 user may also connect power supply 356 to an external power source. During normal operation of power supply 356, main batteries 358 provide operating power to power supply 356 which then provides the operating power to digital camera 100 via both main power bus 362 and secondary power bus 364. During a power failure mode in which main batteries 358 have failed (when their output voltage has fallen below a minimum operational voltage level), backup batteries 360 provide operating power to power supply 356 which then provides the operating power only to secondary power bus 364 of digital camera 100.

DRAM 346 is a contiguous block of dynamic memory that may be selectively allocated for various storage functions. DRAM 346 stores both raw and compressed image data and is also used by CPU 344 while executing the software routines used within computer 110. The raw image data received from imaging device 114 are temporarily stored in several input buffers (not shown) within DRAM 346. Once the raw image data are processed, the data are stored in a frame buffer (not shown) for display, on LCD screen 402. Finally, LCD controller 390 accesses DRAM 346 and transfers processed image data to LCD screen 402 for display.

Figure 3A:
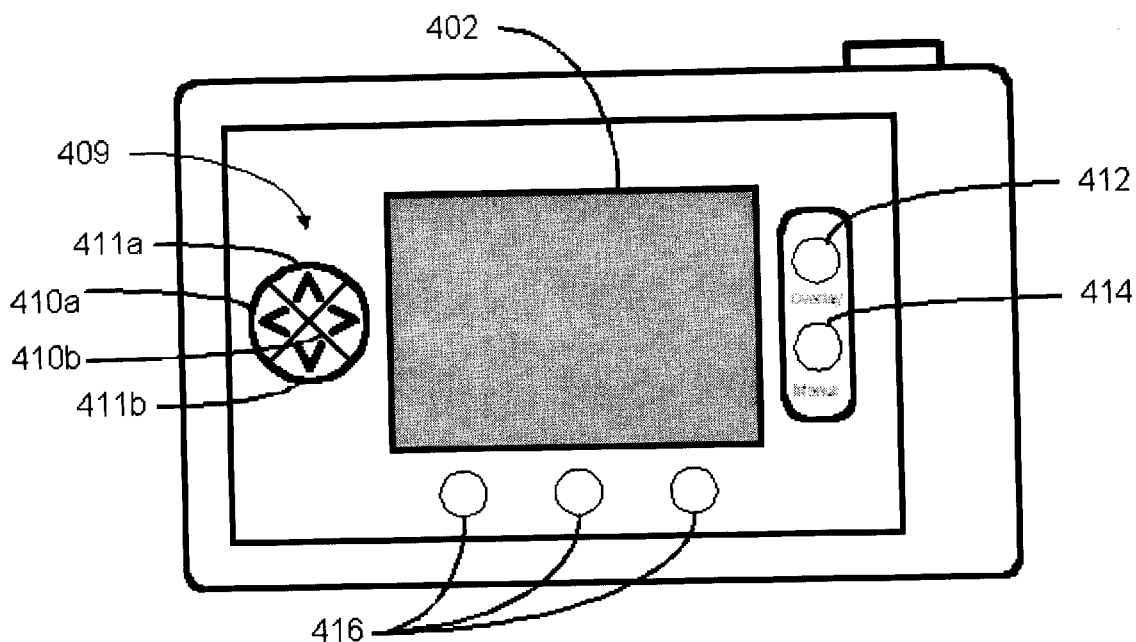
FIGS. 3A and 3B are, respectively, a rear elevation view and a top elevation view of one embodiment of the digital camera of FIG. 2 in accordance with the present invention.
Figure 3B:
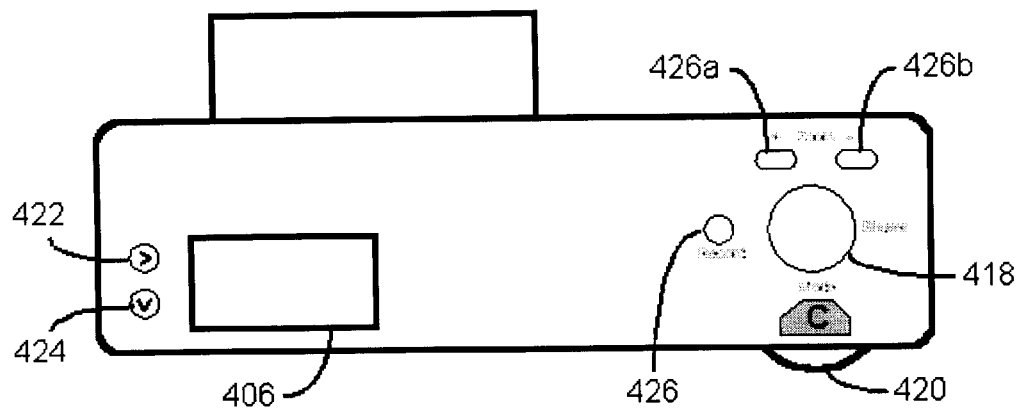

FIGS. 3A and 3B are diagrams depicting the preferred hardware components of user interface 408 (FIG. 2) of digital camera 100. FIG. 3A is a back view of digital camera 100 showing LCD screen 402, four-way navigation control button 409, overlay button 412, menu button 414, and a set of programmable soft keys 416.

FIG. 3B is a top view of digital camera 100 showing shutter button 418 and mode dial 420. The digital camera may optionally include status LCD 406, status LCD scroll button 422 and select button 424, sound record button 426, and zoom-in, zoom-out buttons 426a and 426b.

With reference back to FIG. 3A, digital camera 100 is provided with several different operating modes for supporting various camera functions. The modes relevant to this description are capture or record mode for capturing images, and play mode for playing back the captured images on LCD screen 402. In capture mode, digital camera 100 supports the actions of preparing to capture an image and of capturing an image. In review mode, digital camera 100 supports the actions of reviewing camera contents, editing and sorting images, and printing and transferring images. In play mode, digital camera 100 allows the user to view screen-sized images in the orientation that the image was captured. Play mode also allows the user to hear recorded sound associated to a displayed image, and to play back sequential groupings of images, which may comprise time lapse, slide show, and burst image images. The user preferably switches between the capture, review, and play modes.

With reference still to FIG. 3A, to take a picture, digital camera 100 must be placed into capture mode. If LCD screen 402 is activated, then the camera displays to the user a "live view" of the object viewed through the camera lens on LCD screen 402 as a successive series of real-time frames. If LCD screen 402 is not activated, then the user may capture an image using a conventional optical viewfinder (not shown).

Continuing with reference to FIG. 3A, during the execution of live view generation, frames of raw image data are sequentially captured by imaging device 114 (FIG. 2) at a reduced resolution suitable for LCD screen 402, and the frames of raw image data are stored in DRAM 346 (FIG. 2). The live view generation process then performs gamma correction and color conversion on the raw CCD data to convert the data into either a RGB or YCC color format which is compatible with LCD screen 402. (RGB is an abbreviation for Red, Green, Blue, and YCC is an abbreviation for Luminance, Chrominance-red and Chrominance-blue.) The raw image data are also processed for extracting exposure, focus, and white balance settings, and the like. After converting each frame of data to YCC (typically, YCC 2:2:2 format), the YCC image data are transferred to LCD screen 402 for display.

The live view frames generated during live view generation are displayed until the user decides to capture the image (i.e., take a picture). When the user presses the shutter button to capture an image, the imaged data are captured at a resolution set by the user, transformed into YCC 4:2:2 color space, compressed (e.g., JPEG), and stored as an image file. Live view then resumes to allow the capture of another image. The user may then either continue to capture images or switch digital camera 100 to play mode in order to play back and view the previously captured images on LCD screen 402. In play mode, the user may also hear any recorded sound associated with a displayed image.

Figure 4:
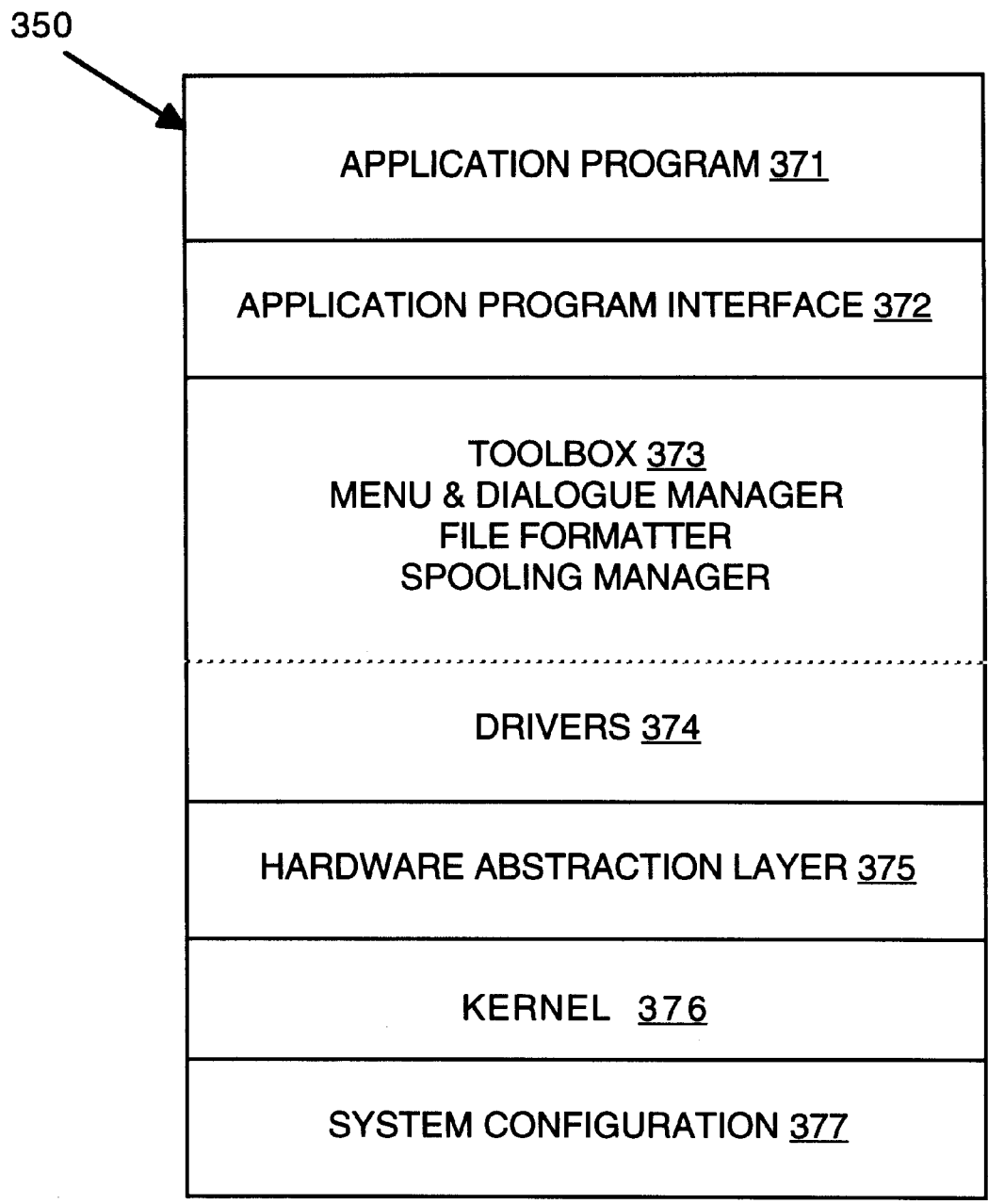
FIG. 4 is a diagram of one embodiment of the non-volatile memory of the digital camera of FIG. 2 in accordance with the present invention.

Referring now to FIG. 4, a diagram of one embodiment of nonvolatile memory 350 of FIG. 2 is shown. Non-volatile memory 350 includes application program 371, application program interface 372, toolbox 373, drivers 374, hardware abstraction layer 375, kernel 376, and system configuration 377.

Application program 371 includes program instructions for controlling and coordinating the various functions of digital camera 100 (FIG. 2). Different application programs may be preferably loaded by the user into digital camera 100 depending on the planned uses of the camera. Application program interface 372 defines a standard interface between application program 371 and toolbox 373.

Toolbox 373 contains the various software routines used to control the various processes of digital camera 100. In general, toolbox 373 provides software routines for printing images, displaying images, organizing data, and the like. Toolbox 373 includes a menu and dialogue manager, which comprises software routines that are used to provide information for controlling access to camera control menus and camera control menu items. The menus, in turn, enable communication between digital camera 100 and the user, and provide the user with access to the features of digital camera 100. Also included in toolbox 373 is a file formatter, consisting of software routines for creating an image file from processed image data, and a spooling manager.

Drivers 374 are for controlling various hardware devices within digital camera 100, such as the motors used to adjust the lens to change focus. Hardware abstraction layer (HAL) 375 defines a standard interface between toolbox 373/drivers 374 and the implementation hardware specific to the make and model of the digital camera. Kernel 376 provides basic underlying services for the operating system of digital camera 100. System configuration 377 performs initial start-up routines for digital camera 100, including the boot routine and initial system diagnostics.

Present Invention Architecture for Image Processing

The present invention is a flexible architecture for image processing in a digital image device (e.g., digital camera 100). As will be seen by the discussion below, the present invention permits the use of different modes of image processing while maintaining the same operating system, application program and application program interface (e.g., application program 371 and application program interface 372 of FIG. 4). That is, the image processing mode used in a particular digital camera platform is invisible to the operating system and to application program 371.

The present invention accomplishes this by defining data structures that are flexible enough that different imaging processing subsystems can be implemented without affecting the software/hardware architecture that surrounds the subsystem. As will be seen, the present invention utilizes a well-defined interface that serves as a common point for entering and exiting the image processing subsystem without changing or perturbing the upstream and downstream elements of the digital camera.

The present invention provides the framework in which image processing can be accomplished in three different modes, depending on the degree of hardware and software assistance associated with the particular digital camera platform. The first mode, referred to herein as the "software architecture," implements an architecture that manages buffering within the architecture and that uses plug-in image processing modules. The second mode, referred to herein as the "software/hardware architecture," supports the use of function calls to read in and write out data and utilizes hardware elements for image processing. The third mode, referred to herein as the "hardware architecture," provides an address in memory for the input and output buffers in a direct memory access (DMA) environment, and uses an image processing hardware system. Each of these three modes are described in further detail below in conjunction with FIGS. 6 through 14.

The present invention therefore provides a framework that enables image processing to be accomplished for different digital camera platforms. Hence, it is appreciated that the present invention may be implemented with image processing embodiments other than those described below.

Software Architecture

Figure 5:
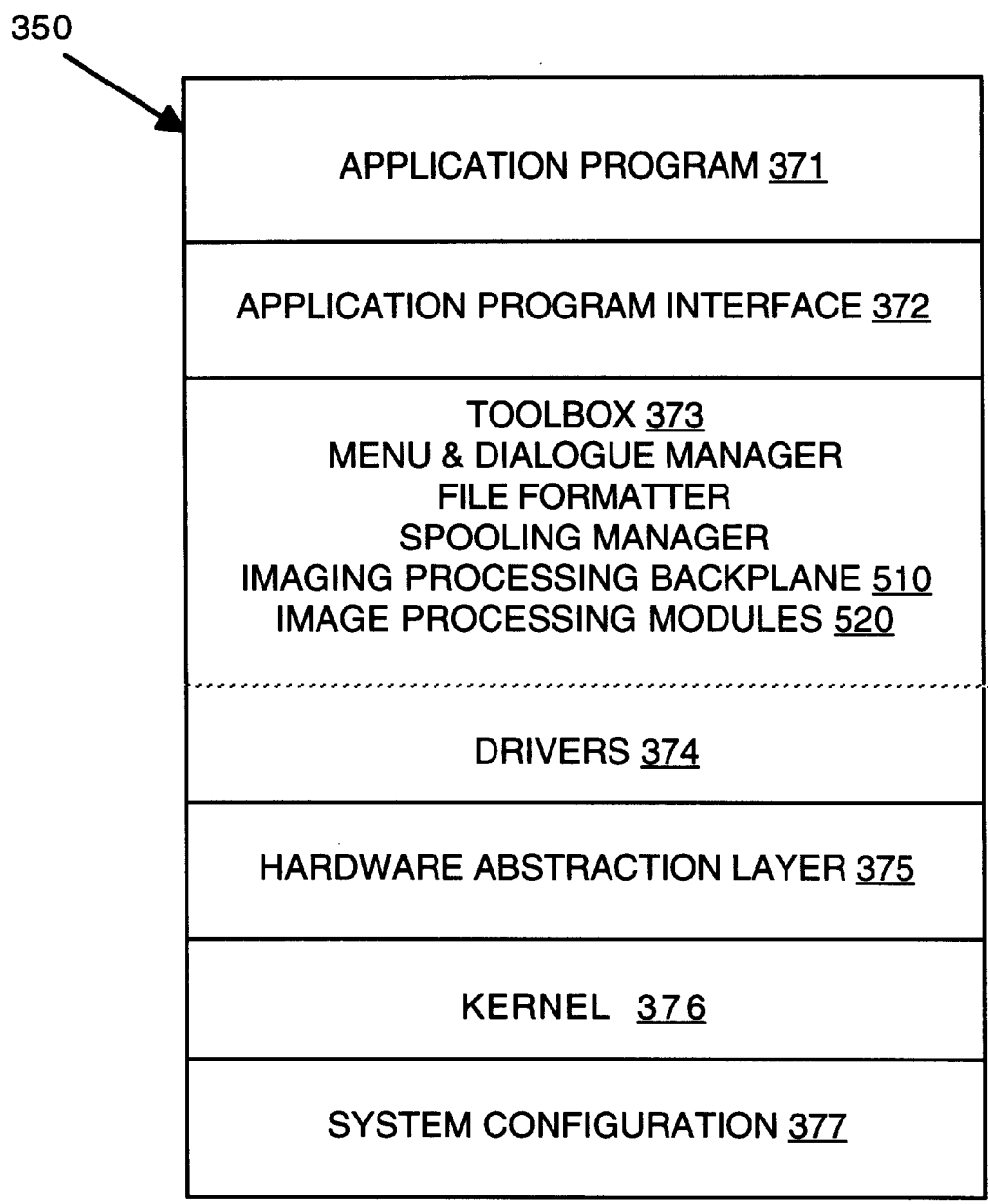
FIG. 5 is a diagram of the non-volatile memory of FIG. 4 showing the image processing backplane and image processing modules in accordance with one embodiment of the present invention.

With reference now to FIG. 5, in accordance with one embodiment of the present invention, non-volatile memory 350 also contains image processing backplane 510, which coordinates the functioning and communication of various image processing modules 520 and handles the data flow between these modules. Image processing modules 520 include selectable plug-in software routines that analyze and manipulate captured image data in a variety of ways, depending on the particular module(s) selected. In the present embodiment, three image processing modules are utilized. The first image processing module performs linearization, defect correction, and white balance. The second image processing module performs interpolation and color correction. The third image processing module performs sharpening and color space conversion. However, it is understood that different numbers and functions of image processing modules other than those just described may be used in accordance with the present invention.

Figure 6:
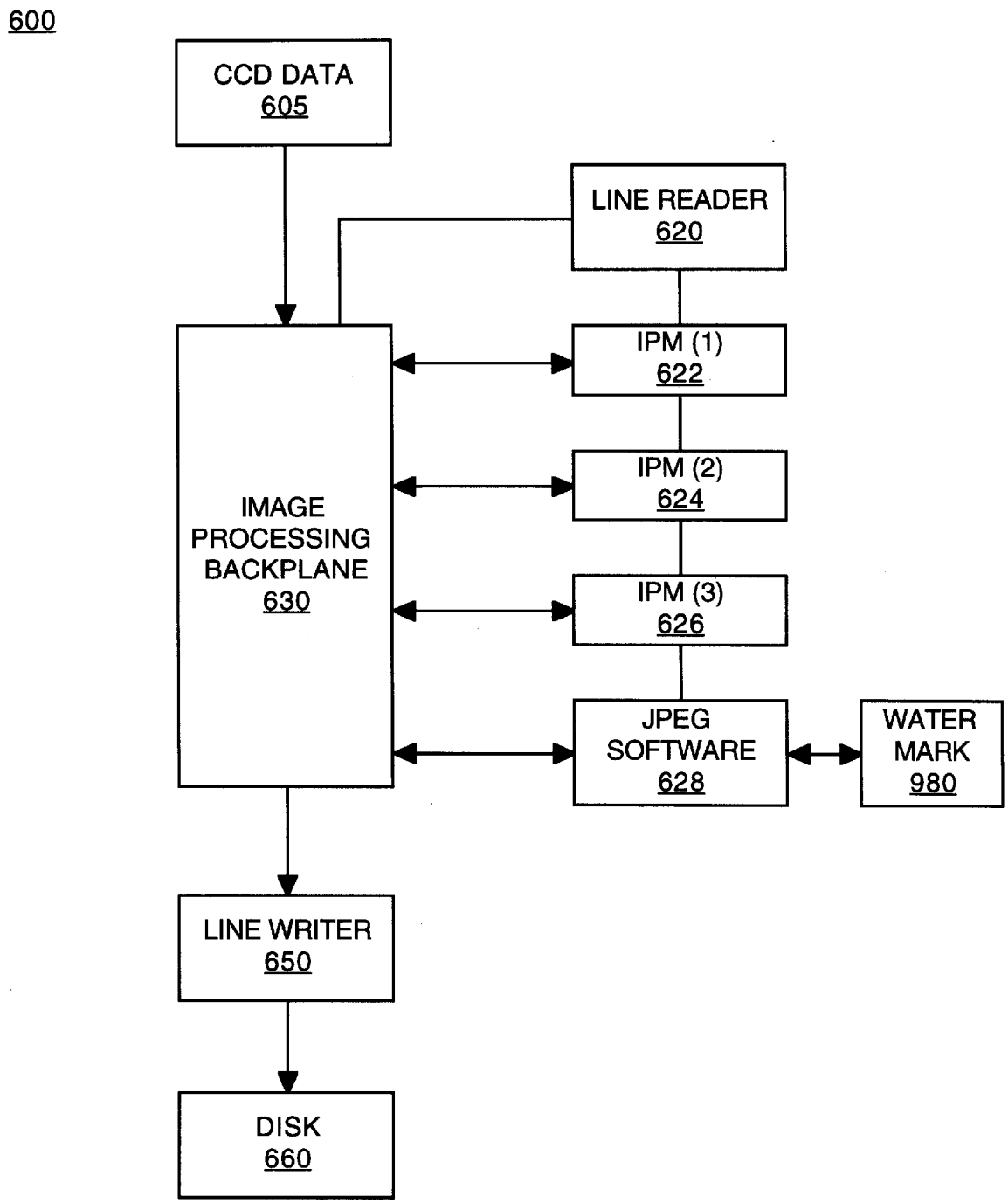
FIG. 6 is a block diagram of the architecture utilized with a software image processing subsystem in accordance with the present invention.

Referring now to FIG. 6, a block diagram of software architecture 600 is provided in accordance with the present invention. As explained above in conjunction with FIGS. 1 and 3A, when an image is captured by digital camera 100, the raw image data (typically in CCD format, e.g., CCD data 605) are stored in input buffers within DRAM 346.

In the present embodiment, image processing backplane 630 includes three plug-in image processing software modules IPM(1) 622, IPM(2) 624 and IPM(3) 626; however, it understood that a different number of image processing modules may be utilized in accordance with the present invention. Image processing backplane 630 also includes JPEG software 628. It should be appreciated that encoding systems other than JPEG may be used with the present invention.

The three image processing modules and JPEG software 628 function by reading lines of incoming data, processing the data, and then sending out lines of data. IPM(1) 622, IPM(2) 624, IPM(3) 626 and JPEG software 628 are loaded by image processing backplane 630 during startup of the digital camera. Image processing modules and JPEG software are well known in the art.

Line reader 620 and line writer 650 manage the flow of data into and out of IPM(1) 622, IPM(2) 624, IPM(3) 626 and JPEG software 628. In this embodiment, line reader 620 is a software element that provides a functional interface for retrieving lines of data from CCD data 605. Image processing backplane 630 uses this interface to retrieve lines of data that are fed into IPM(1) 622, which in turn feeds into IPM(2) 624, which in turn feeds into IPM(3) 626, which in turn feeds into JPEG software 628. In the case where the digital camera has an orientation sensor and the image is captured with the camera rotated from a purely horizontal or vertical orientation, then line reader, 620 feeds the lines of data in a rotated fashion so that the image on the disk (e.g., removable memory 354 of FIG. 3A) is also rotated.

In the present embodiment, water mark 980 includes software used to impress on the image data such information as the time and date. However, it is appreciated that in other embodiments of the present invention, the water marking function may not be used.

Continuing with reference to FIG. 6, line writer 650 is a software element that writes lines of data to disk 660 (e.g., RAM disk or Flash disk).

Figure 7:
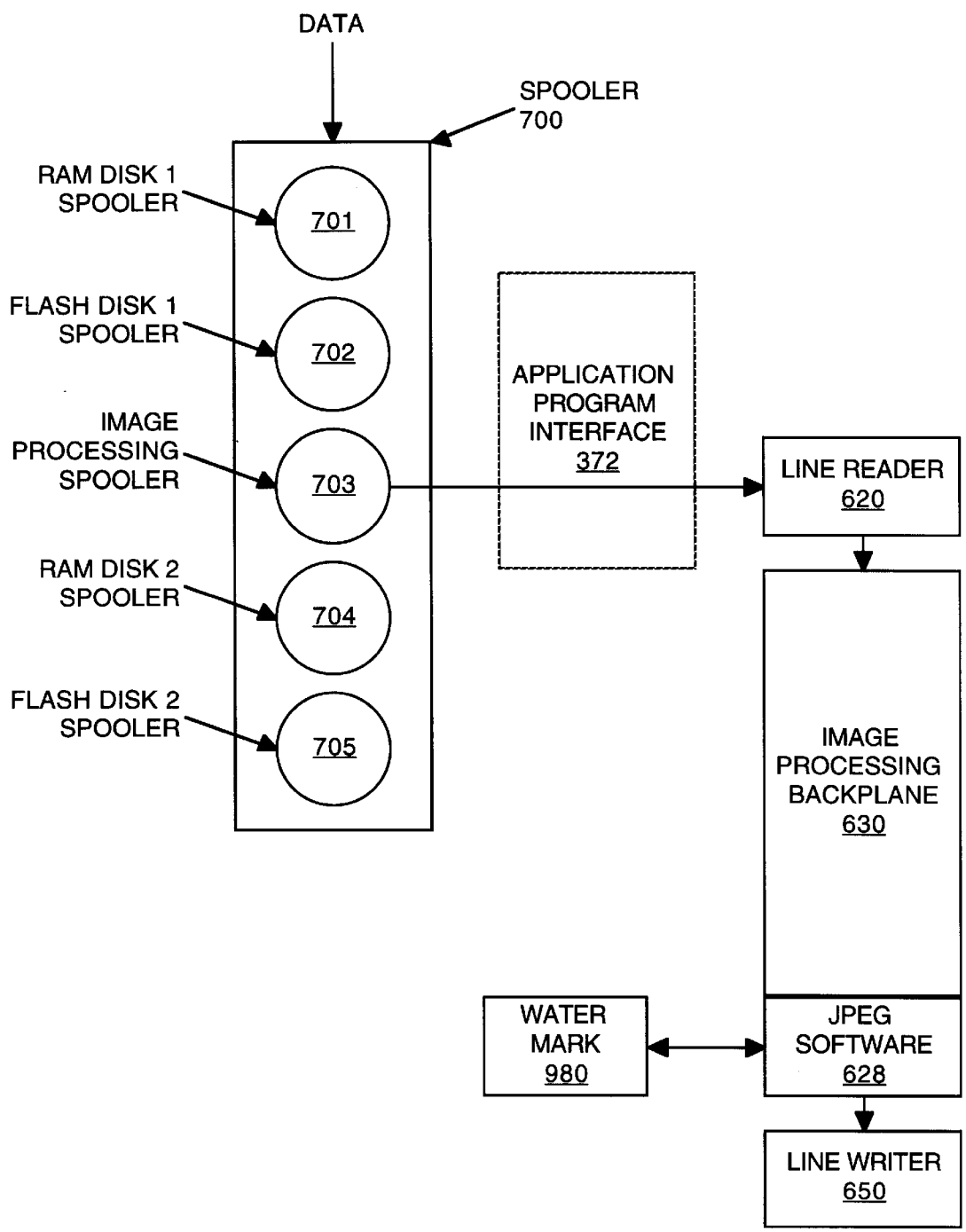
FIG. 7 is a block diagram illustrating the data path through the architecture of FIG. 6 in accordance with the present invention.

With reference now to FIG. 7, the data path through software architecture 600 is illustrated. Lines of data are fed through spooler 700; as used herein, a spooler is a process or device for transferring data from one process or device to a second process or device. Spooler 700 is comprised of RAM disk 1 spooler 701, Flash disk 1 spooler 702, image processing spooler 703, RAM disk 2 spooler 704 and Flash disk 2 spooler 705; however, it is understood that a different spooler configuration may be used in accordance with the present invention. In accordance with the present invention, spooler 700 initializes line reader 620 and line writer 650.

The lines of data fed through spooler 700 can be from any source, e.g., the data can come from memory (e.g., an image buffer), from the RAM disk (as a file), or from the Flash disk (as a file). In accordance with the present invention, image processing spooler 703 is used to provide the data to line reader 620. As indicated by the illustration, line reader 620, image processing backplane 630, JPEG software 628 and line writer 650 are situated below application program interface 372 on the data path. Hence, in accordance with the present invention, the image processing subsystem (e.g., image processing backplane 630 including JPEG software 628) is invisible to the operating system and to application program 371 (FIG. 5).

Figure 8:
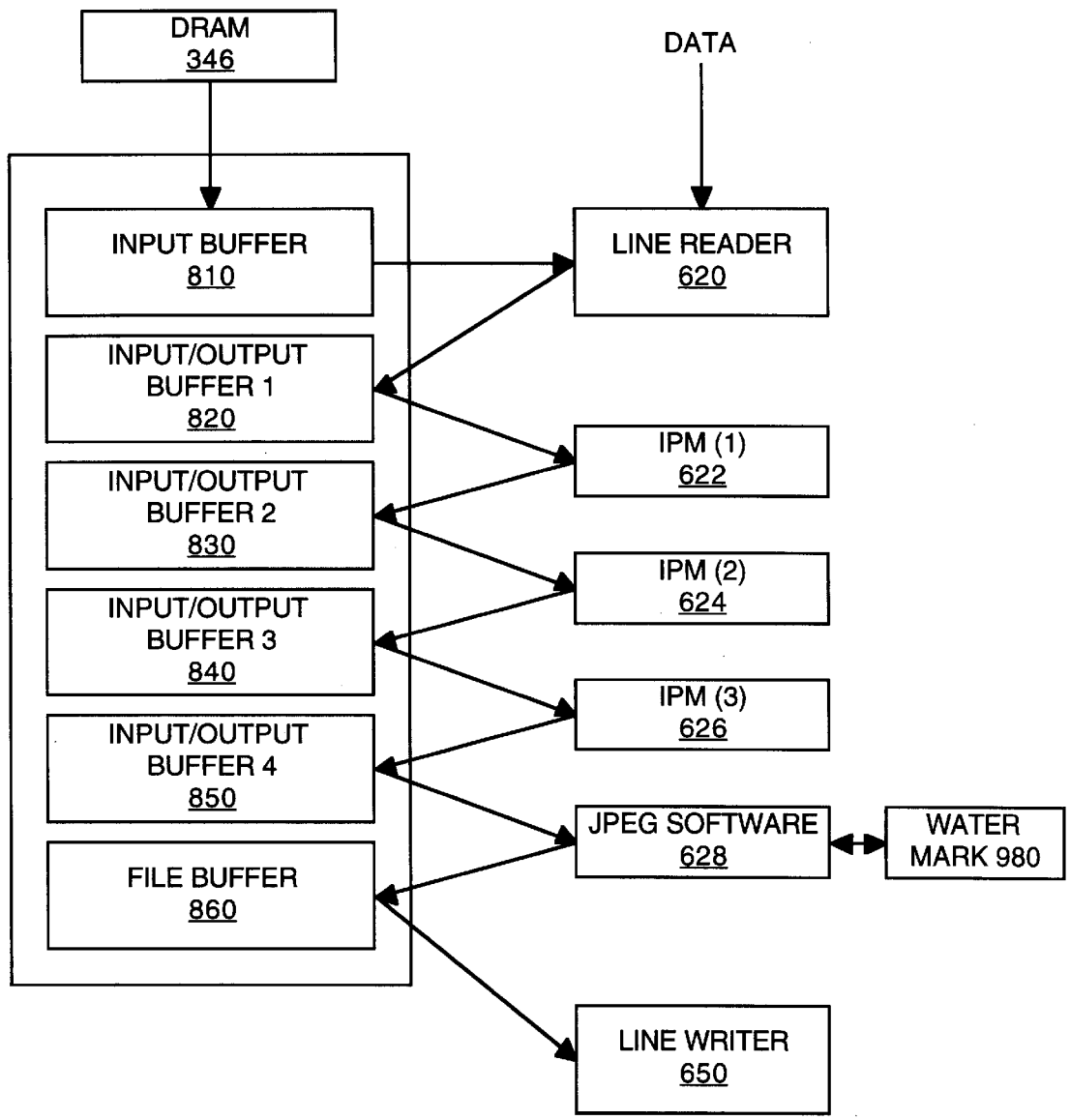
FIG. 8 is an illustration of the data structure associated with the architecture of FIG. 6 in accordance with the present invention.

Refer now to FIG. 8, which illustrates data structure 800 associated with software architecture 600. Input buffer 810 is a buffer that is created and used only when data are not spooled, in which case the data are loaded from DRAM 346. Otherwise, lines of image data are read by line reader 620 from, for example, a RAM disk or a Flash disk via spooler 700 as shown in FIG. 7.

The lines of data are read into input/output buffer 820, which serves as the output buffer for line reader 620 and the input buffer for IPM(1) 622. In the present embodiment, input/output buffer 820 can hold only one line of data. Thus, when the next line of data is received by input/output buffer 820, the line of data already in that buffer is driven into IPM(1) 622.

After processing by IPM(1) 622 (e.g., linearization, defect correction, and white balance), the line of data is transferred to input/output buffer 830, which serves as the output buffer for IPM(1) 622 and the input buffer for IPM(2) 624. In the present embodiment, input/output buffer 830 is capable of holding up to five lines of data. The lines of data are not forwarded from input/output buffer 830 to IPM(2) 624 until the buffer is full. When the buffer is full, the next line of data received by input/output buffer 830 drives one line of data into IPM(2) 624.

After processing by IPM(2) 624 (e.g., interpolation and color correction), the line of data is transferred to input/output buffer 840, which serves as the output buffer for IPM(2) 624 and the input buffer for IPM(3) 626. In the present embodiment, input/output buffer 840 is capable of holding only one line of data. Thus, in the same manner as above, when the next line of data is received by input/output buffer 840, the line of data already in that buffer is driven into IPM(3) 626.

After processing by IPM(3) 626 (e.g., sharpening and color space conversion), the line of data is transferred to input/output buffer 850, which serves as the output buffer for IPM(3) 626 and the input buffer for JPEG software 628. JPEG software 628 accepts lines of data as input. As data are buffered and processed through JPEG software 628, a stream of bytes that represent compressed data is forwarded to file buffer 860 then to line writer 650, which writes the data to, for example, the RAM disk or the Flash disk.

Software/Hardware Architecture

Figure 9:
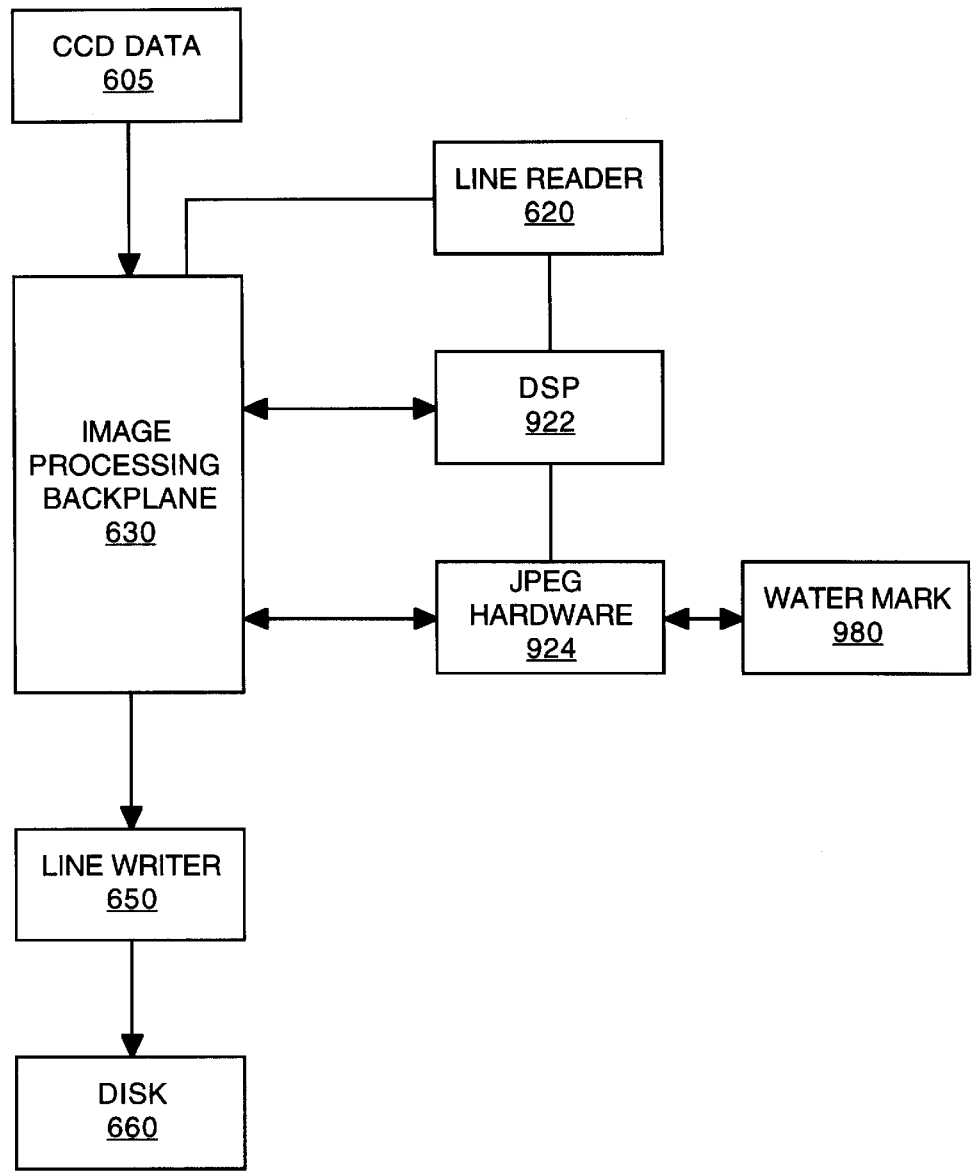
FIG. 9 is a block diagram of the architecture utilized with a software/hardware image processing subsystem in accordance with the present invention.

With reference now to FIG. 9, a block diagram of software/hardware architecture 900 is provided for a different image processing embodiment in accordance with the present invention. As explained above in conjunction with FIGS. 1 and 3A, when an image is captured by digital camera 100, the raw image data (e.g., CCD data 605) are stored in input buffers within DRAM 346.

In this embodiment, image processing backplane 630 includes a hybrid of software and hardware components. Relative to software architecture 600 (FIG. 6) described above, in software/hardware architecture 900 the software image processing modules are replaced by digital signal processor (DSP) 922 and the JPEG software is replaced by JPEG hardware 924. Digital signal processors and JPEG hardware are well known in the art. It should be appreciated that encoding systems other than JPEG may be used with the present invention.

In the present embodiment, water mark 980 includes software used to impress on the image data such information as the time and date. However, it is appreciated that in other embodiments of the present invention, the water marking function may not be used.

The software elements line reader 620 and line writer 650 are retained, and they function as described above in conjunction with FIGS. 6, 7 and 8. These elements serve as part of the common interface between the operating system and the image processing subsystem that is independent of the mode of image processing that is used.

Figure 10:
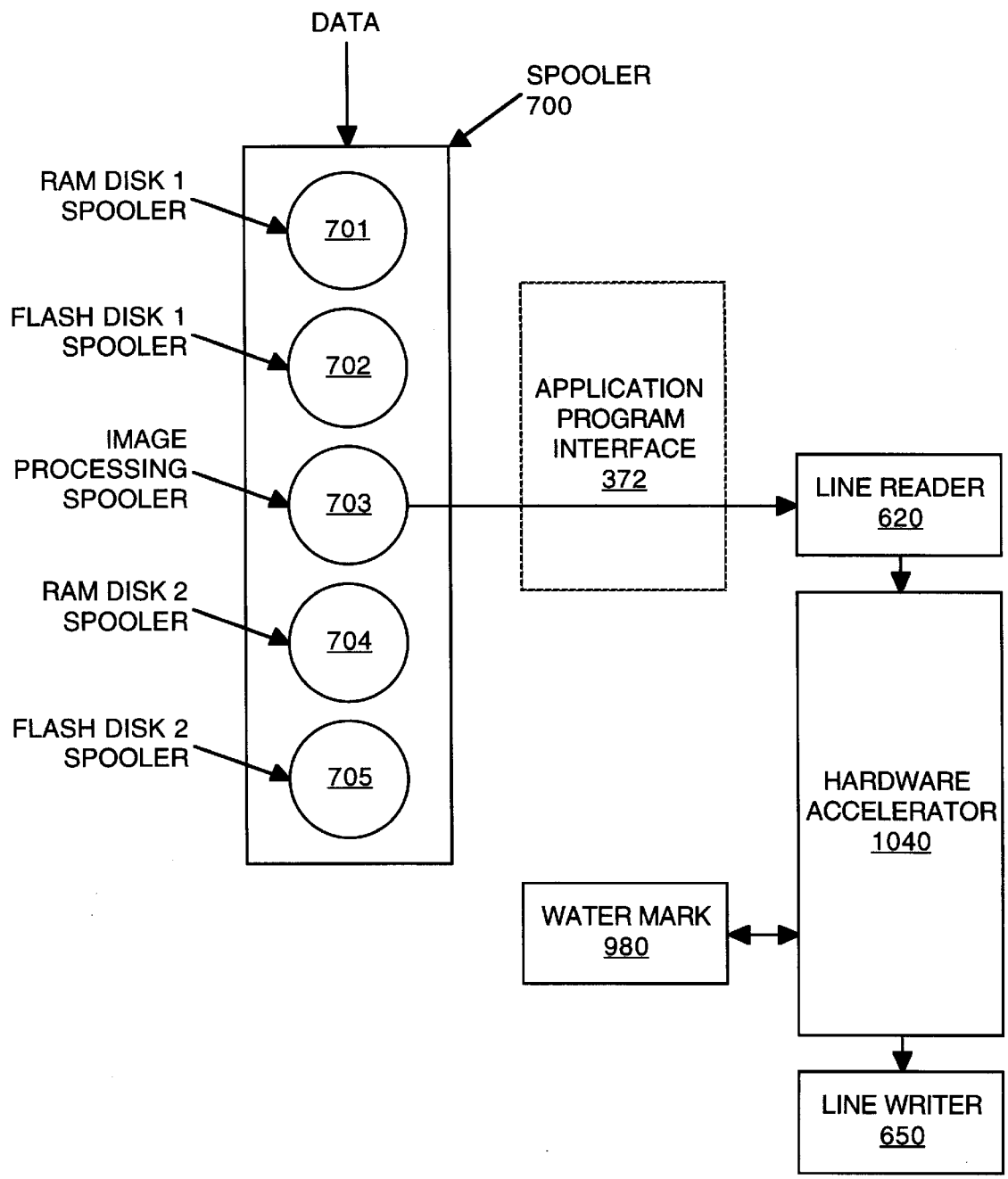
FIG. 10 is a block diagram illustrating the data path through the architecture of FIG. 9 in accordance with the present invention.

With reference now to FIG. 10, the data path through software/hardware architecture 900 is illustrated. In the same manner as described for software architecture 600 (see discussion in conjunction with FIG. 7), lines of data are fed through spooler 700. The lines of data are from any source (e.g., memory, RAM disk, or Flash disk), and are fed using image processing spooler 703 to line reader 620. The data can include thumbnail, screennail, or image information. In accordance with the present invention, spooler 700 initializes line reader 620 and line writer 650.

Continuing with reference to FIG. 10, hardware accelerator 1040 comprises DSP 922 and JPEG hardware 924 of FIG. 9. Line reader 620, hardware accelerator 1040, and line writer 650 are situated below application program interface 372 on the data path. Hence, in accordance with the present invention, the image processing subsystem (e.g., hardware accelerator 1040) is invisible to the operating system and to application program 371 (FIG. 5).

Figure 11:
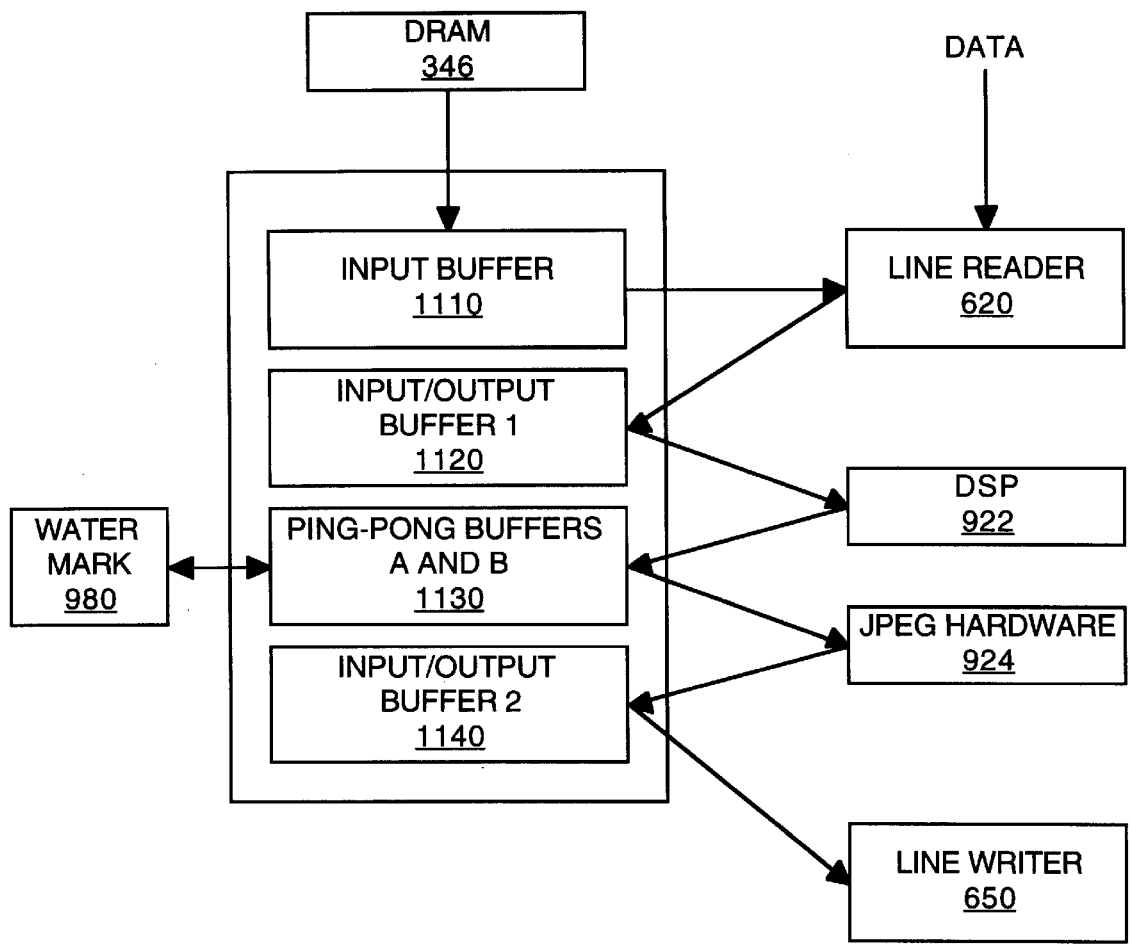
FIG. 11 is an illustration of the data structure associated with the architecture of FIG. 9 in accordance with the present invention.

Refer now to FIG. 11, which illustrates data structure 1100 associated with software/hardware architecture 900. Input buffer 1110 is a buffer that is created and used only when data are not spooled, in which case the data are loaded from DRAM 346. Otherwise, in the same manner as described above in conjunction with software architecture 600 of FIG. 6, lines of data are read by line reader 620 from, for example, the RAM disk or the Flash disk via spooler 700 as shown in FIG. 10.

The lines of data are read into input/output buffer 1120, which serves as the output buffer for line reader 620 and the input buffer for DSP 922. After processing by DSP 922, the data are forwarded to ping-pong buffers A and B 1130 and from there to JPEG hardware 924. DSP 922 and JPEG hardware 924 can be run in parallel (at the same time). Thus, one of the. ping-pong buffers (e.g., buffer A) is filled and the data therein are then fed to JPEG hardware 924. JPEG hardware 924 operates on these data while the other ping-pong buffer (e.g., buffer B) is filled. When JPEG hardware 924 is finished with the data from buffer A, it begins to operate on the data in buffer B, and in the meantime buffer A is refilled. Water mark 980 is impressed on the image data in ping-pong buffers A and B 1130.

After processing by JPEG hardware 924, the data are forwarded to input/output buffer 1140, then to line writer 650, which writes the data to, for example, the RAM disk or the Flash disk. Line writer 650 provides an interface between the image processing subsystem and the downstream elements of the digital camera that is independent of the image processing mode being used.

Hardware Architecture

Figure 12:
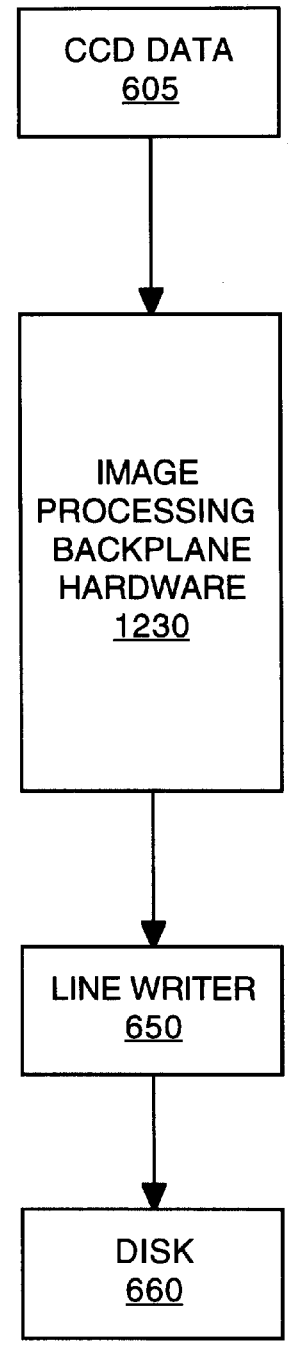
FIG. 12 is a block diagram of the architecture utilized with a hardware image processing subsystem in accordance with the present invention.

With reference now to FIG. 12, a block diagram of hardware architecture 1200 is provided for a different image processing embodiment in accordance with the present invention. As explained above in conjunction with FIGS. 1 and 3A, when an image is captured by digital camera 100, the raw image data (e.g., CCD data 605) are stored in input buffers within DRAM 346.

In this embodiment, the image processing backplane uses only hardware (e.g., image processing backplane hardware 1230) for image processing. Relative to software architecture 600 (FIG. 6) described above, in hardware architecture 1200 the software image processing modules and the JPEG software are replaced by an image processing hardware system. Relative to software/hardware architecture 900 (FIG. 9) described above, the software-assisted digital signal processor and JPEG hardware are replaced by an image processing hardware system. In addition, as will be described in detail below, the functions performed by line reader of hardware architecture 1200 are extended to include additional functions relative to line reader 620 of software architecture 600 and software/hardware architecture 900.

In this embodiment, CCD data 605 is read from memory using direct memory access (DMA) and processed by image processing backplane hardware 1230. Image processing backplane hardware 1230 is exemplified by the image processing hardware system described in the patent application assigned to the assignee of the present invention and entitled "Image Processing System for High Performance Digital Imaging Devices;" by Eric C. Anderson; Ser. No. 09/081,694; Attorney Docket Number FSPT-P156; filed on May 19, 1998; and herein incorporated by reference. Other image processing hardware systems known in the art may also be used in accordance with the present invention.

Figure 13:
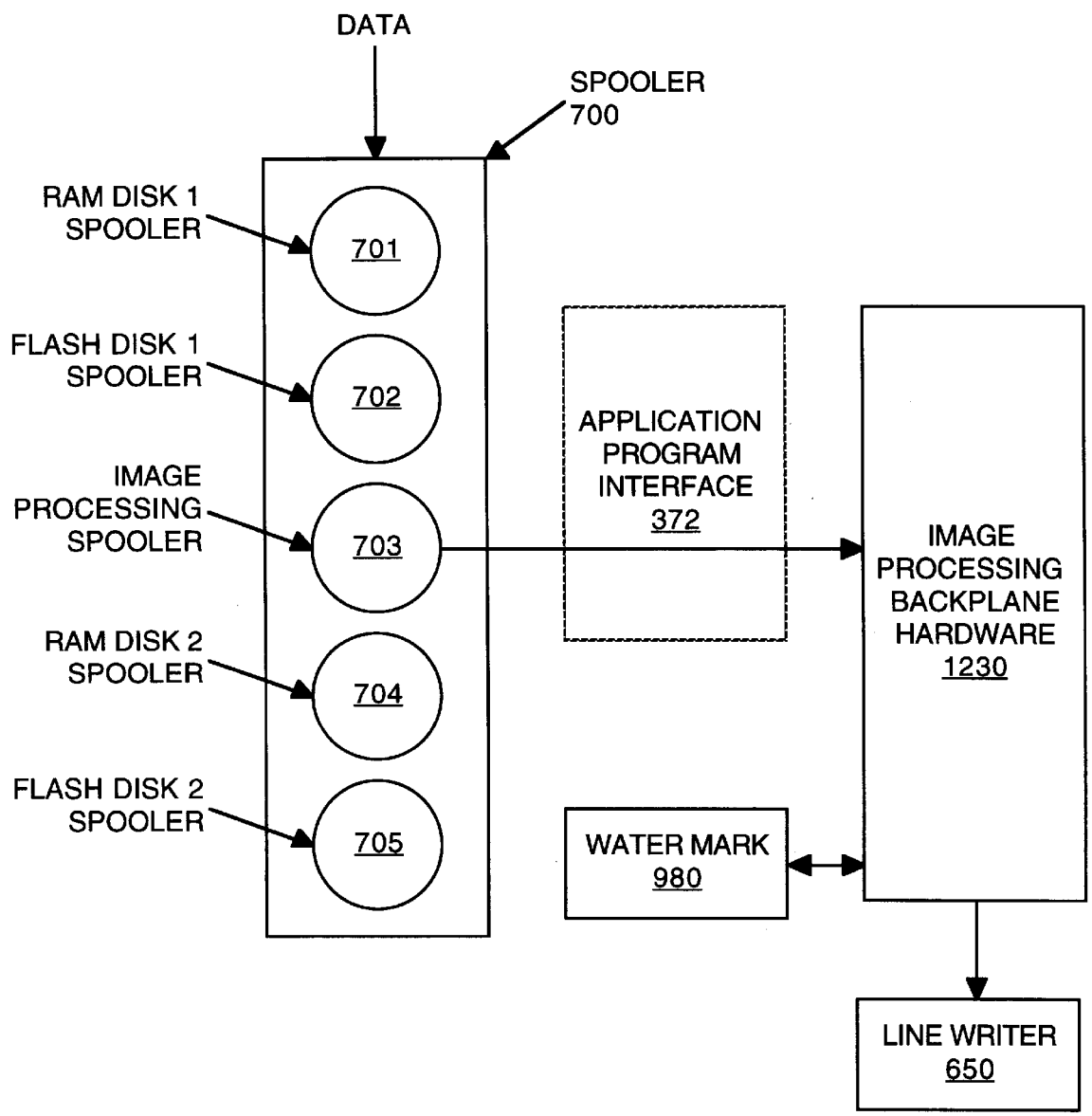
FIG. 13 is a block diagram illustrating the data path through the architecture of FIG. 12 in accordance with the present invention.

With reference now to FIG. 13, the data path through hardware architecture 1200 is illustrated. As stated above, hardware architecture 1200 is DMA-based. Lines of data are passed through spooler 700; however, in this case, the stages of spooler 700 (specifically, RAM disk spooler 701 and Flash disk spooler 702) are each turned off so that the data flow through the spooler without being spooled. Thus, the data are fed through spooler 700 very quickly and the associated latency is not significant. Lines of data are still read off of the third stage of spooler 700 (e.g., image processing spooler 703). By retaining the spooler in hardware architecture 1200 in this manner, the same application program interface (e.g., application program interface 372) is maintained and the image processing subsystem remains invisible to the operating system and to application program 371 (FIG. 5).

Figure 14:
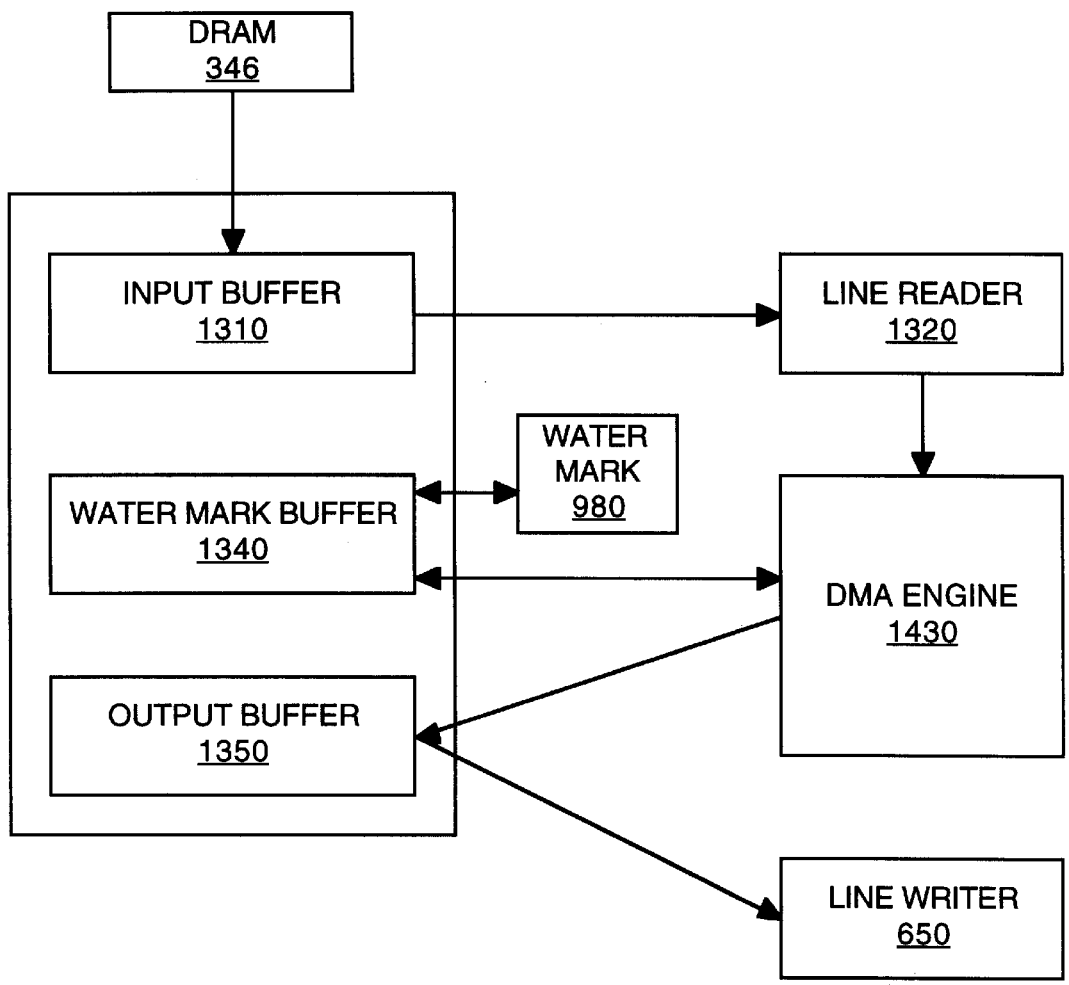
FIG. 14 is an illustration of the data structure associated with the architecture of FIG. 12 in accordance with the present invention.

Refer now to FIG. 14, which illustrates data structure 1300 associated with hardware architecture 1200. In this embodiment, data has to be in memory (e.g., DRAM 346); thus, if the data are previously spooled, they must be despooled and brought back to memory. In accordance with the present invention, spooler 700 initializes line reader 1320 and line writer 650.

In this embodiment, the functions of line reader 1320 are extended relative to the functions of line reader 620 of software architecture 600 and software/hardware architecture 900 (FIGS. 6 and 9, respectively). Line reader 1320 functions to manage the data so that the data are properly located for processing. That is, line reader 1320 searches memory for the data and identifies the location of the image data to be processed. If the data are not in memory, then line reader 1320 directs memory to be allocated (e.g., input buffer 1310), reads the data off of the disk (e.g., the RAM disk), and places the data in input buffer 1310. Line reader 1320 thereby provides the memory location so that DMA channels can be set up. If the data are previously spooled, line reader 1320 directs that the data be despooled.

Continuing with reference to FIG. 14, once input buffer 1310 is created by line reader 1320, the digital camera's operating system then sets up DMA engine 1430 and output buffer 1350, and executes image processing. Line writer 650 writes the data to the RAM disk, the Flash disk, or memory (e.g., DRAM 346). Line writer 650 provides an interface between the image processing subsystem and the downstream elements of the digital camera that is independent of the image processing mode being used.

If the water mark function is being used, the hardware operates in two phases with the water mark being impressed between the two phases. DMA engine 1430 sends data to and retrieves data from image processing backplane hardware 1230 in the first phase and places the partially processed data into water mark buffer 1340. The water mark is placed on the data in water mark buffer 1340. DMA engine 1430 then sends the data back to image processing backplane hardware 1230 for the second phase of processing. It is appreciated that other embodiments of the present invention may not use the water marking function.

Method of Present Invention Architecture for Image Processing

Figure 15:
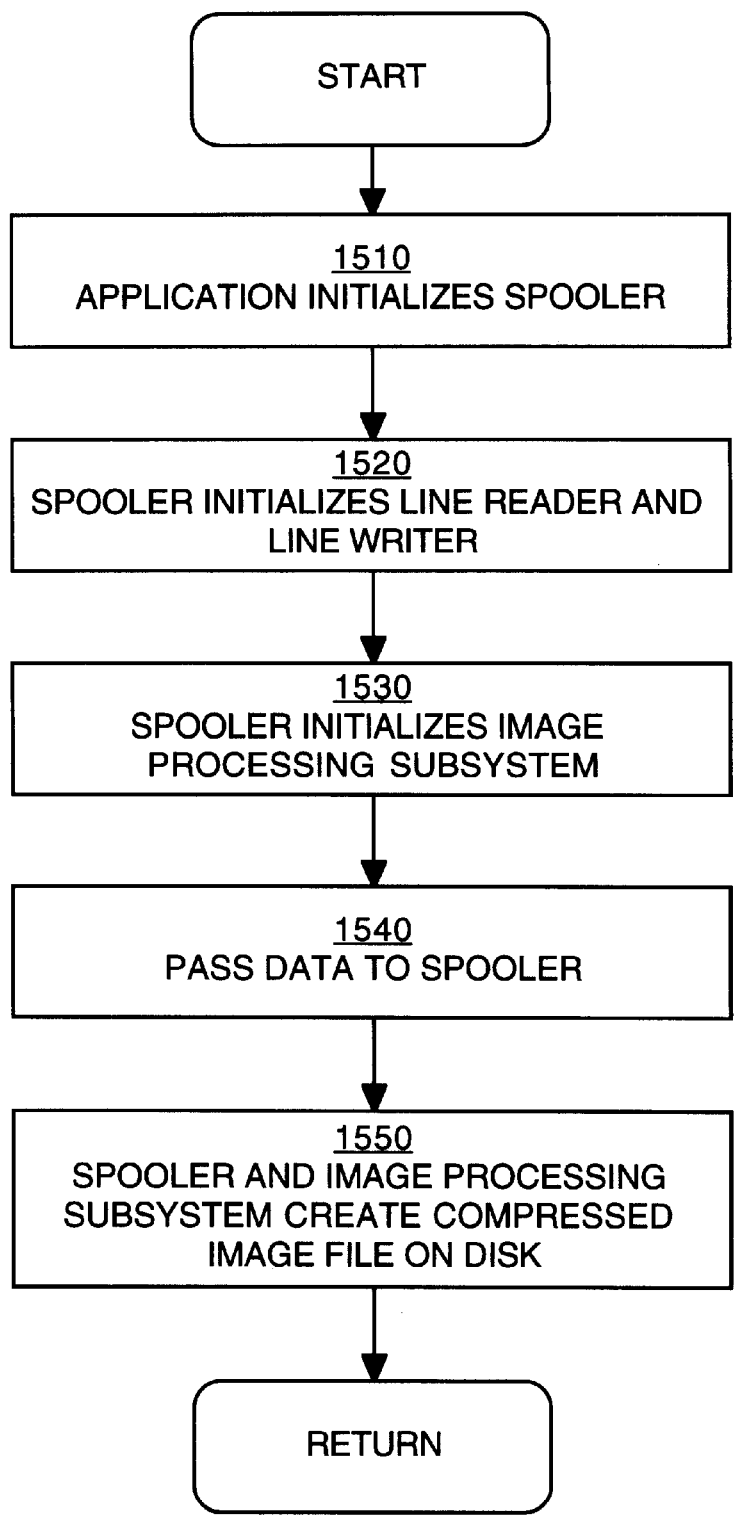
FIG. 15 is a flowchart of a process for implementing the architectures of FIGS. 6, 9 and 12 in accordance with one embodiment of the present invention.

FIG. 15 is a flow chart illustrating process 1500 for implementing the present invention architecture for image processing (e.g., software architecture 600, software/hardware architecture 900, and hardware architecture 1200). Process 1500 is implemented by the digital camera's operating system (e.g., Digita™) executed by CPU 344 of FIG. 2. It should be appreciated that process 1500 is an exemplary process and that the present invention is not limited by the embodiment discussed below.

In step 1510, application program 371 initializes the spooler (e.g., spooler 700 of FIGS. 7, 10 and 13).

In step 1520, spooler 700 initializes the line reader and the line writer (e.g., line reader 620, line reader 1320, and line writer 650 of FIGS. 8, 11 and 14). To initialize the line reader, spooler 700 specifies, for example, the rows and columns of the input buffer, the Bayer pattern, the orientation of the data, and the address of the input buffer. To initialize the line writer, spooler 700 specifies the output buffer to be used or the file extension (for example, for the RAM disk, Flash disk, or some another location within the digital camera).

In step 1530, spooler 700 initializes the image processing subsystem and the data structure associated with the image processing mode. In accordance with the present invention, software architecture 600 and data structure 800, software/hardware architecture 900 and data structure 1100, or hardware architecture 1200 and data structure 1400 may be utilized. In the present embodiment, spooler 700 disables the RAM disk spooler and the Flash disk spooler (e.g., RAM disk 1 spooler 701 and Flash disk 1 spooler 702) if hardware image processing is utilized.

In step 1540, the data are passed from the input buffer to spooler 700. As described above, spooler 700 is used to spool the data for software architecture 600 and software/hardware architecture 900, but the stages of spooler 700 are turned off in hardware architecture 1200. However, by retaining spooler 700 in each of these architectures, process 1500 is sufficiently flexible to be used with each of these architectures.

In step 1550, spooler 700 and the image processing subsystem are executed to convert raw image data into a compressed image file. The image processing subsystem used is either the software implementation of software architecture 600, the software/hardware implementation of software/hardware architecture 900, or the hardware implementation of hardware architecture 1200. In this embodiment, spooler 700 spools the data according to which of its stages are turned on, forwards data to the line reader, and directs the image processing subsystem to being processing. The process data are then written to memory, the RAM disk, or the Flash disk.

In summary, the present invention is a flexible architecture for image processing within a digital image device such as a digital camera. The present invention permits the use of different types of image processing subsystems within a single operating system. The type of image processing subsystem is invisible to the particular operating system and application program, and in effect one image processing subsystem could be swapped out and another swapped in without the operating system and application program having to recognize that a change occurred.

The present invention provides the framework in which the image processing can be accomplished using software, hardware, or a combination of software and hardware. The present invention accomplishes this by defining data structures that are flexible enough that different imaging processing subsystems can be implemented without affecting the software/hardware architecture that surrounds the subsystem. The present invention utilizes a well-defined interface that suitably provides a common point for entering and exiting the image processing subsystem without changing or perturbing the upstream and downstream elements of the digital camera (conversely, the interface provides a common point at which the image processing subsystem taps into the data path of the digital camera without perturbing the data path). Thus, the present invention provides an operating system that can be used with an digital camera platform and is adaptable for use with foreseeable platforms.

The foregoing descriptions, of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for processing image data in a digital image device, said system comprising:

a bus;

a central processing unit coupled to said bus;

an image processing subsystem coupled to said central processing unit for processing said image data using a particular processing mode;

a memory unit coupled to said bus, said memory unit having stored therein an operating system comprising instructions executed by said central processing unit to manage said image processing subsystem;

said memory unit further having a data structure corresponding to said processing mode, said data structure comprising a plurality of buffers for managing said image data for said image processing subsystem during image processing, said data structure providing an interface between said operating system and said image processing subsystem, such that said operating system is independent of said processing mode used by said image processing subsystem; and a data storage element coupled to said bus for storing said image data after image processing.

2. The system of claim 1 wherein said digital image device is a digital camera.

3. The system of claim 1 further comprising a data line writer element coupled to said data structure for writing data to said data storage element, said data line writer element providing an interface between said image processing subsystem and said data storage element that is independent of said processing mode used by said image processing subsystem.

4. The system of claim 1 further comprising a spooler element coupled to said memory unit, where in said spooler element is for transferring s aid image data into said data structure.

5. The system of claim 4 further comprising a data line reader element coupled to said spooler element for reading said image data from said spooler element into said data structure.

6. The system of claim 5 wherein said processing mode used by said image processing subsystem comprises a plurality of image processing modules and a JPEG software element.

7. The system of claim 5 wherein said processing mode used by said image processing subsystem comprises a digital signal processor and a JPEG hard ware element for processing said image data.

8. The system of claim 5 wherein said processing mode used by said image processing subsystem comprises an image processing hardware system.

9. The system of claim 8 wherein said image processing hardware system reads said image data using a direct memory access (DMA) technique.

10. The system of claim 8 wherein said data line reader element is used to identify a memory buffer where said image data is located.

11. The system of claim 8 wherein said data line reader element is used to create a memory buffer for said image data and to write said image data to said memory buffer.

12. The system of claim 1 wherein said image processing subsystem applies a water mark to said image data, said water mark comprising time and date information associated with said image data.

13. A method for processing image data in a digital image device, said method comprising the steps of:
 a) creating a data structure corresponding to an image processing mode used by an image processing subsystem of said digital image device;
 b) initializing said image processing subsystem and said data structure;
 c) forwarding said image data to said data structure;
 d) processing said image data using said processing mode used by said image processing subsystem; and
 e) writing said image data to a data storage element.

14. The method of claim 13 further comprising the steps of:
 initializing a spooler element, said spooler element for transferring said image data into said data structure;
 initializing a data line reader element, said data line reader element for reading said image data from said spooler element into said data structure; and
 initializing a data line writer element, said data line writer element for transferring said image data to a storage element after image processing.

15. The method of claim 13 wherein said step d) comprises processing said image data using a plurality of image processing modules and a JPEG software element.

16. The method of claim 13 wherein said step d) comprises processing said image data using a digital signal processor and a JPEG hardware element.

17. The method of claim 13 wherein said step d) comprises processing said image data using an image processing hardware system.

18. The method of claim 17 wherein said image processing hardware system reads said image data using a direct memory access (DMA) technique.

19. The method of claim 17 wherein said data line reader element is used to identify a memory buffer where said image data is located.

20. The method of claim 17 wherein said data line reader element is used to create a memory buffer for said image data and to write said image data to said memory buffer.

21. The method of claim 13 wherein said image processing subsystem applies a water mark to said image data, said water mark comprising time and date information associated with said image data.

22. A system for processing image data in a digital camera, said system comprising:
 a bus;
 a central processing unit coupled to said bus;
 an image processing subsystem coupled to said central processing unit for processing said image data using a particular processing mode;
 a memory unit coupled to said bus, said memory unit having stored therein an operating system comprising instructions executed by said central processing unit to manage said image processing subsystem;
 said memory unit further having a data structure corresponding to said processing mode, said data structure comprising a plurality of buffers for managing said image data for said image processing subsystem during image processing;
 a data storage element coupled to said bus for storing said image data after image processing;
 a data line writer element coupled to said data structure for writing image data to said data storage element, said data line writer element providing an interface between said image processing subsystem and said data storage element that is independent of said processing mode used by said image processing subsystem;
 a spooler element coupled to said memory unit, wherein said spooler element is for transferring said image data into said data structure; and
 a data line reader element coupled to said spooler element for reading said image data from said spooler element;
 said data structure, said spooler element and said line reader element providing an interface between said operating system and said image processing subsystem, such that said operating system is independent of said processing mode used by said image processing subsystem.

23. The system of claim 22 wherein said processing mode used by said image processing subsystem comprises a plurality of image processing modules and a JPEG software element.

24. The system of claim 22 wherein said processing mode used by said image processing subsystem comprises a digital signal processor and a JPEG hardware element for processing said image data.

25. The system of claim 22 wherein said JPEG hardware element applies a water mark to said image data, said water mark comprising time and date information associated with said image data.

26. The system of claim 22 wherein said processing mode used by said image processing subsystem comprises an image processing hardware system.

27. The system of claim 26 wherein said image processing hardware system reads said image data using a direct memory access (DMA) technique.

28. The system of claim 26 wherein said data line reader element is used to identify a memory buffer where said image data is located.

29. The system of claim 26 wherein said data line reader element is used to create a memory buffer for said image data and to write said image data to said memory buffer.

30. The system of claim 22 wherein said image processing subsystem applies a water mark to said image data, said water mark comprising time and date information associated with said image data.

* * * * *

UNITED STATES PATENT AND TRADEMARK OFFICE
CERTIFICATE OF CORRECTION

| | | |
|---|---|---|
| PATENT NO. | : 6,400,471 C1 | Page 1 of 1 |
| APPLICATION NO. | : 90/010676 | |
| DATED | : July 19, 2011 | |
| INVENTOR(S) | : David Kuo et al. | |

It is certified that error appears in the above-identified patent and that said Letters Patent is hereby corrected as shown below:

Column 3, line 10, change "procesing" to --processing--.

Signed and Sealed this
Twenty-seventh Day of September, 2011

David J. Kappos
*Director of the United States Patent and Trademark Office*

(12) EX PARTE REEXAMINATION CERTIFICATE (8409th)
United States Patent
Kuo et al.

(10) Number: US 6,400,471 C1
(45) Certificate Issued: Jul. 19, 2011

(54) FLEXIBLE ARCHITECTURE FOR IMAGE PROCESSING

(75) Inventors: David Kuo, San Jose, CA (US); Eric Anderson, San Jose, CA (US)

(73) Assignee: Flashpoint Technology, Inc., San Jose, CA (US)

Reexamination Request:
No. 90/010,676, Oct. 2, 2009
No. 90/010,875, Mar. 4, 2010

Reexamination Certificate for:
Patent No.: 6,400,471
Issued: Jun. 4, 2002
Appl. No.: 09/249,741
Filed: Feb. 11, 1999

(51) Int. Cl.
*H04N 1/32* (2006.01)

(52) U.S. Cl. ............... 358/468; 348/231.1; 358/442
(58) Field of Classification Search .................. None
See application file for complete search history.

(56) References Cited

U.S. PATENT DOCUMENTS

| | | |
|---|---|---|
| 2,289,555 A | 7/1942 | Simons |
| 3,814,227 A | 6/1974 | Hurd, III et al. |
| 3,971,065 A | 7/1976 | Bayer |
| 3,991,625 A | 11/1976 | Preston |
| 4,011,571 A | 3/1977 | Okuzawa |
| 4,017,680 A | 4/1977 | Anderson et al. |
| 4,125,111 A | 11/1978 | Hudspeth et al. |
| 4,158,208 A | 6/1979 | Dischert |
| 4,172,327 A | 10/1979 | Kuehn et al. |
| 4,195,317 A | 3/1980 | Stratton |
| 4,234,890 A | 11/1980 | Astle |
| 4,325,080 A | 4/1982 | Satoh |
| 4,337,479 A | 6/1982 | Tomimoto et al. |
| 4,347,618 A | 8/1982 | Kavouras et al. |
| 4,364,650 A | 12/1982 | Terashita et al. |
| 4,403,303 A | 9/1983 | Howes et al. |
| 4,416,282 A | 11/1983 | Saulson |
| 4,456,931 A | 6/1984 | Toyoda et al. |
| 4,466,230 A | 8/1984 | Osselaere |
| 4,470,067 A | 9/1984 | Mino |
| 4,471,382 A | 9/1984 | Toyoda et al. |
| 4,519,692 A | 5/1985 | Michalik |
| 4,531,161 A | 7/1985 | Murakoshi |
| 4,540,276 A | 9/1985 | Ost |
| 4,574,319 A | 3/1986 | Konishi |
| 4,601,055 A | 7/1986 | Kent |
| 4,623,930 A | 11/1986 | Oshima et al. |

(Continued)

FOREIGN PATENT DOCUMENTS

| | | |
|---|---|---|
| EP | 0122094 A2 | 10/1984 |
| EP | 0421769 A2 | 4/1991 |
| EP | 0422447 A2 | 4/1991 |

(Continued)

OTHER PUBLICATIONS

Foley et al., *Computer Graphics—Principles and Practice, Second Edition in C*, Addison–Wesley Publishing Company, New York, 1996, pp. 132–137, 506–509, 755–759.

(Continued)

*Primary Examiner*—Andrew L Nalven

(57) ABSTRACT

A system and a method for processing image data in a digital image device such as a digital camera. The present invention includes a bus, a central processing unit coupled to the bus, an image processing subsystem coupled to the central processing unit for processing the image data using a particular processing mode, a memory unit coupled to the bus, and a data storage element for storing the image data after image processing. The memory unit has stored therein an operating system for managing the image processing subsystem, and the memory unit also has a data structure for managing the image data for the image processing subsystem during image processing. The data structure provides an interface between the operating system and the image processing subsystem, such that the operating system is independent of the processing mode used by the image processing subsystem.

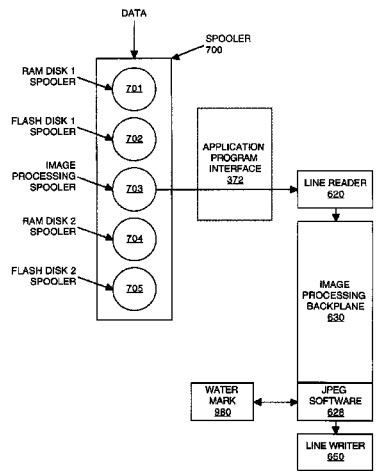

U.S. PATENT DOCUMENTS

| | | |
|---|---|---|
| 4,691,253 A | 9/1987 | Silver |
| 4,723,169 A | 2/1988 | Kaji |
| 4,736,224 A | 4/1988 | Watanabe |
| 4,739,409 A | 4/1988 | Baumeister |
| 4,772,941 A | 9/1988 | Noble |
| 4,774,600 A | 9/1988 | Baumeister |
| 4,823,283 A | 4/1989 | Diehm |
| 4,827,347 A | 5/1989 | Bell |
| 4,855,831 A | 8/1989 | Miyamoto |
| 4,866,292 A | 9/1989 | Takemoto et al. |
| 4,882,683 A | 11/1989 | Rupp et al. |
| 4,887,161 A | 12/1989 | Watanabe et al. |
| 4,888,812 A | 12/1989 | Dinan et al. |
| 4,893,198 A | 1/1990 | Little |
| 4,907,089 A | 3/1990 | Yamaguchi |
| 4,916,435 A | 4/1990 | Fuller |
| 4,935,809 A | 6/1990 | Hayashi et al. |
| 4,937,676 A | 6/1990 | Finelli et al. |
| 4,937,685 A | 6/1990 | Barker et al. |
| 4,965,675 A | 10/1990 | Hori |
| 4,972,495 A | 11/1990 | Blike et al. |
| 4,982,291 A | 1/1991 | Kurahashi |
| 4,992,887 A | 2/1991 | Aragaki |
| 5,001,697 A | 3/1991 | Torres |
| 5,007,027 A | 4/1991 | Shimoi |
| 5,016,107 A | 5/1991 | Sasson |
| 5,018,017 A | 5/1991 | Sasaki et al. |
| 5,020,012 A | 5/1991 | Stockberger |
| 5,021,989 A | 6/1991 | Fujisawa et al. |
| 5,027,150 A | 6/1991 | Inoue |
| 5,031,329 A | 7/1991 | Smallidge |
| 5,032,918 A | 7/1991 | Ota et al. |
| 5,032,926 A | 7/1991 | Imai et al. |
| 5,034,804 A | 7/1991 | Sasaki et al. |
| 5,040,068 A | 8/1991 | Parulski |
| 5,040,070 A | 8/1991 | Higashitsutsumi |
| 5,043,801 A | 8/1991 | Watanabe |
| 5,043,816 A | 8/1991 | Nakano |
| 5,057,924 A | 10/1991 | Yamada |
| 5,063,600 A | 11/1991 | Norwood |
| 5,065,246 A | 11/1991 | Takemoto et al. |
| 5,067,029 A | 11/1991 | Takahashi |
| 5,070,406 A | 12/1991 | Kinoshita |
| 5,073,823 A | 12/1991 | Yamada et al. |
| 5,077,582 A | 12/1991 | Kravette et al. |
| 5,083,383 A | 1/1992 | Heger |
| 5,093,716 A | 3/1992 | Kondo et al. |
| 5,099,262 A | 3/1992 | Tanaka et al. |
| 5,101,225 A | 3/1992 | Wash |
| 5,101,364 A | 3/1992 | Davenport |
| 5,106,107 A | 4/1992 | Justus |
| 5,122,827 A | 6/1992 | Saegusa et al. |
| 5,123,088 A | 6/1992 | Kasahara et al. |
| 5,124,537 A | 6/1992 | Chandler et al. |
| 5,124,814 A | 6/1992 | Takahashi et al. |
| 5,130,812 A | 7/1992 | Yamaoka |
| 5,138,459 A | 8/1992 | Roberts |
| 5,138,460 A | 8/1992 | Egawa |
| 5,140,358 A | 8/1992 | Tokunaga |
| 5,142,319 A | 8/1992 | Wakabayashi |
| 5,144,358 A | 9/1992 | Tsuru et al. |
| 5,144,445 A | 9/1992 | Higashitsutsumi |
| 5,146,353 A | 9/1992 | Isoguchi et al. |
| 5,153,729 A | 10/1992 | Saito |
| 5,153,730 A | 10/1992 | Nagasaki |
| 5,159,364 A | 10/1992 | Yanagisawa et al. |
| 5,161,012 A | 11/1992 | Choi |
| 5,161,025 A | 11/1992 | Nakao |
| 5,161,535 A | 11/1992 | Short |
| 5,164,751 A | 11/1992 | Weyer |
| 5,164,831 A | 11/1992 | Kuchta |
| 5,179,653 A | 1/1993 | Fuller |
| 5,187,776 A | 2/1993 | Yanker |
| 5,189,404 A | 2/1993 | Masimo et al. |
| 5,189,490 A | 2/1993 | Shetty |
| 5,193,538 A | 3/1993 | Ekwall |
| 5,194,944 A | 3/1993 | Uchiyama |
| 5,198,851 A | 3/1993 | Ogawa |
| 5,199,101 A | 3/1993 | Cusick et al. |
| 5,200,818 A | 4/1993 | Neta et al. |
| 5,218,459 A | 6/1993 | Parulski et al. |
| 5,218,647 A | 6/1993 | Blonstein |
| 5,220,420 A | 6/1993 | Hoarty et al. |
| 5,220,614 A | 6/1993 | Crain |
| 5,223,935 A | 6/1993 | Tsuji |
| 5,224,207 A | 6/1993 | Filion et al. |
| 5,229,856 A | 7/1993 | Koshiishi |
| 5,231,511 A | 7/1993 | Kodama et al. |
| 5,231,651 A | 7/1993 | Ozaki |
| 5,237,648 A | 8/1993 | Mills |
| 5,237,650 A | 8/1993 | Priem et al. |
| 5,239,419 A | 8/1993 | Kim |
| 5,247,321 A | 9/1993 | Kazami |
| 5,247,327 A | 9/1993 | Suzuka |
| 5,253,071 A | 10/1993 | MacKay |
| 5,260,795 A | 11/1993 | Sakai |
| 5,262,863 A | 11/1993 | Okada |
| 5,262,867 A | 11/1993 | Kojima |
| 5,262,868 A | 11/1993 | Kaneko et al. |
| 5,262,869 A | 11/1993 | Hong |
| 5,270,821 A | 12/1993 | Samuels |
| 5,270,831 A | 12/1993 | Parulski et al. |
| 5,274,458 A | 12/1993 | Kondo et al. |
| 5,276,563 A | 1/1994 | Ogawa |
| 5,283,560 A | 2/1994 | Bartlett |
| 5,283,792 A | 2/1994 | Davies |
| 5,287,192 A | 2/1994 | Iizuka |
| 5,301,026 A | 4/1994 | Lee |
| 5,302,997 A | 4/1994 | Cocca |
| 5,307,318 A | 4/1994 | Nemoto |
| 5,309,243 A | 5/1994 | Tsai |
| 5,311,240 A | 5/1994 | Wheeler |
| 5,331,366 A | 7/1994 | Tokunaga |
| 5,335,072 A | 8/1994 | Tanaka et al. |
| 5,341,466 A | 8/1994 | Perlin |
| 5,343,246 A | 8/1994 | Arai et al. |
| 5,343,386 A | 8/1994 | Barber |
| 5,343,509 A | 8/1994 | Dounies |
| 5,345,552 A | 9/1994 | Brown |
| 5,359,427 A | 10/1994 | Sato |
| 5,359,728 A | 10/1994 | Rusnack |
| 5,367,318 A | 11/1994 | Beaudin et al. |
| 5,373,153 A | 12/1994 | Cumberledge |
| 5,375,160 A | 12/1994 | Guidon et al. |
| 5,386,111 A | 1/1995 | Zimmerman |
| 5,386,177 A | 1/1995 | Uhm |
| 5,386,552 A | 1/1995 | Garney |
| 5,390,026 A | 2/1995 | Lim |
| 5,390,314 A | 2/1995 | Swanson |
| 5,392,462 A | 2/1995 | Komaki |
| 5,396,343 A | 3/1995 | Hanselman |
| 5,402,170 A | 3/1995 | Parulski et al. |
| 5,402,171 A | 3/1995 | Tagami et al. |
| 5,404,316 A | 4/1995 | Klingler et al. |
| 5,404,505 A | 4/1995 | Levinson |
| 5,408,265 A | 4/1995 | Sasaki |
| 5,414,811 A | 5/1995 | Parulski et al. |
| 5,416,556 A | 5/1995 | Suzuki et al. |
| 5,420,635 A | 5/1995 | Konishi et al. |
| 5,425,137 A | 6/1995 | Mohan et al. |
| 5,428,733 A | 6/1995 | Carr |

| | | |
|---|---|---|
| 5,432,871 A | 7/1995 | Novik |
| 5,432,900 A | 7/1995 | Rhodes et al. |
| 5,434,618 A | 7/1995 | Hayashi et al. |
| 5,434,958 A | 7/1995 | Surma et al. |
| 5,434,969 A | 7/1995 | Heilveil et al. |
| 5,436,657 A | 7/1995 | Fukuoka |
| 5,436,659 A | 7/1995 | Vincent |
| 5,440,401 A | 8/1995 | Parulski et al. |
| 5,442,465 A | 8/1995 | Compton |
| 5,444,482 A | 8/1995 | Misawa et al. |
| 5,448,372 A | 9/1995 | Axman et al. |
| 5,452,145 A | 9/1995 | Wakui et al. |
| 5,459,830 A | 10/1995 | Ohba et al. |
| 5,461,429 A | 10/1995 | Konishi et al. |
| 5,463,728 A | 10/1995 | Blahut |
| 5,463,729 A | 10/1995 | Kitaguchi |
| 5,465,133 A | 11/1995 | Aoki et al. |
| 5,467,288 A | 11/1995 | Fasciano et al. |
| 5,473,370 A | 12/1995 | Moronaga et al. |
| 5,473,371 A | 12/1995 | Choi |
| 5,475,428 A | 12/1995 | Hintz et al. |
| 5,475,441 A | 12/1995 | Parulski et al. |
| 5,475,812 A | 12/1995 | Corona et al. |
| 5,477,264 A | 12/1995 | Sarbadhikari et al. |
| 5,481,330 A | 1/1996 | Yamasaki |
| 5,481,667 A | 1/1996 | Bieniek et al. |
| 5,486,853 A | 1/1996 | Baxter |
| 5,488,414 A | 1/1996 | Hirasawa |
| 5,489,945 A | 2/1996 | Kannegundla |
| 5,489,955 A | 2/1996 | Satoh |
| 5,493,332 A | 2/1996 | Dalton et al. |
| 5,493,335 A | 2/1996 | Parulski et al. |
| 5,495,342 A | 2/1996 | Harigaya |
| 5,495,559 A | 2/1996 | Makino |
| 5,496,106 A | 3/1996 | Anderson |
| 5,497,193 A | 3/1996 | Mitsuhashi |
| 5,500,936 A | 3/1996 | Allen et al. |
| 5,502,486 A | 3/1996 | Ueda |
| 5,510,830 A | 4/1996 | Ohia et al. |
| 5,512,941 A | 4/1996 | Takahashi |
| 5,513,306 A | 4/1996 | Mills |
| 5,513,342 A | 4/1996 | Leong et al. |
| 5,515,101 A | 5/1996 | Yoshida |
| 5,517,606 A | 5/1996 | Matheny et al. |
| 5,519,815 A | 5/1996 | Klassen |
| 5,521,639 A | 5/1996 | Tomura |
| 5,521,663 A | 5/1996 | Norris |
| 5,521,717 A | 5/1996 | Maeda |
| 5,521,841 A | 5/1996 | Arman et al. |
| 5,523,786 A | 6/1996 | Parulski |
| 5,523,857 A | 6/1996 | Fukushima |
| 5,525,957 A | 6/1996 | Tanaka |
| 5,528,293 A | 6/1996 | Watanabe |
| 5,528,315 A | 6/1996 | Sugiyama |
| 5,530,235 A | 6/1996 | Stefik et al. |
| 5,532,740 A | 7/1996 | Wakui |
| 5,534,975 A | 7/1996 | Stefik et al. |
| 5,537,151 A | 7/1996 | Orr |
| 5,537,530 A | 7/1996 | Edgar |
| 5,539,528 A | 7/1996 | Tawa |
| 5,539,535 A | 7/1996 | Aizawa et al. |
| 5,539,658 A | 7/1996 | McCullough |
| 5,541,656 A | 7/1996 | Kare et al. |
| 5,548,371 A | 8/1996 | Kawahara |
| 5,548,409 A | 8/1996 | Ohta et al. |
| 5,550,646 A | 8/1996 | Hassan et al. |
| 5,550,938 A | 8/1996 | Hayakawa et al. |
| 5,552,806 A | 9/1996 | Lenchik |
| 5,553,277 A | 9/1996 | Hirano et al. |
| 5,555,193 A | 9/1996 | Tsinberg et al. |
| 5,559,554 A | 9/1996 | Uekane et al. |
| 5,560,022 A | 9/1996 | Dunstan et al. |
| 5,563,655 A | 10/1996 | Lathrop |
| 5,568,167 A | 10/1996 | Galbi |
| 5,568,192 A | 10/1996 | Hannah |
| 5,572,233 A | 11/1996 | Kakegawa |
| 5,574,933 A | 11/1996 | Horst |
| 5,576,757 A | 11/1996 | Roberts et al. |
| 5,576,759 A | 11/1996 | Kawamura et al. |
| 5,577,190 A | 11/1996 | Peters |
| 5,578,757 A | 11/1996 | Roth |
| 5,579,048 A | 11/1996 | Hirasawa |
| 5,579,450 A | 11/1996 | Hanyu |
| 5,581,311 A | 12/1996 | Kuroiwa |
| 5,585,845 A | 12/1996 | Kawamura |
| 5,587,740 A | 12/1996 | Brennan |
| 5,589,902 A | 12/1996 | Gruel et al. |
| 5,590,306 A | 12/1996 | Watanabe et al. |
| 5,592,301 A | 1/1997 | Shimada |
| 5,594,524 A | 1/1997 | Sasagaki |
| 5,597,193 A | 1/1997 | Conner |
| 5,606,365 A | 2/1997 | Maurinus |
| 5,608,491 A | 3/1997 | Sasagaki |
| 5,610,653 A | 3/1997 | Abecassis |
| 5,619,738 A | 4/1997 | Petruchik |
| 5,621,459 A | 4/1997 | Ueda |
| 5,621,906 A | 4/1997 | O'Neill |
| 5,625,412 A | 4/1997 | Aciu et al. |
| 5,630,017 A | 5/1997 | Gasper et al. |
| 5,631,701 A | 5/1997 | Miyake |
| 5,631,871 A | 5/1997 | Park et al. |
| 5,633,573 A | 5/1997 | van Phuoc et al. |
| 5,633,678 A | 5/1997 | Parulski et al. |
| 5,633,976 A | 5/1997 | Ogino |
| 5,634,000 A | 5/1997 | Wicht |
| 5,635,983 A | 6/1997 | Ohmori |
| 5,635,984 A | 6/1997 | Lee |
| 5,637,871 A | 6/1997 | Piety et al. |
| 5,638,123 A | 6/1997 | Yamaguchi |
| 5,638,498 A | 6/1997 | Tyler et al. |
| 5,638,501 A | 6/1997 | Gough et al. |
| 5,640,193 A | 6/1997 | Wellner |
| 5,640,202 A | 6/1997 | Kondo |
| 5,640,204 A | 6/1997 | Tsutsui |
| 5,640,627 A | 6/1997 | Nakano |
| 5,644,694 A | 7/1997 | Appleton |
| 5,648,816 A | 7/1997 | Wakui |
| 5,649,032 A | 7/1997 | Burt et al. |
| 5,649,186 A | 7/1997 | Ferguson |
| 5,651,107 A | 7/1997 | Frank et al. |
| 5,659,547 A | 8/1997 | Scarr et al. |
| 5,659,729 A | 8/1997 | Nielsen |
| 5,664,087 A | 9/1997 | Tani et al. |
| 5,666,580 A | 9/1997 | Ito et al. |
| 5,668,639 A | 9/1997 | Martin |
| 5,671,378 A | 9/1997 | Acker et al. |
| 5,671,440 A | 9/1997 | Curry |
| 5,673,304 A | 9/1997 | Connor et al. |
| 5,674,003 A | 10/1997 | Andersen |
| 5,675,358 A | 10/1997 | Bullock et al. |
| 5,675,752 A | 10/1997 | Scott et al. |
| 5,680,533 A | 10/1997 | Yamato |
| 5,680,534 A | 10/1997 | Yamato et al. |
| 5,682,197 A | 10/1997 | Moghadam et al. |
| 5,682,207 A | 10/1997 | Takeda et al. |
| 5,682,326 A | 10/1997 | Klingler et al. |
| 5,682,441 A | 10/1997 | Ligtenberg et al. |
| 5,684,511 A | 11/1997 | Westerink et al. |
| 5,684,542 A | 11/1997 | Tsukagoshi |
| 5,687,408 A | 11/1997 | Park |
| 5,699,109 A | 12/1997 | Nishimura et al. |
| 5,703,644 A | 12/1997 | Mori et al. |

| | | | | | | |
|---|---|---|---|---|---|---|
| 5,706,049 | A | 1/1998 | Moghadam et al. | 5,815,201 | A | 9/1998 | Hashimoto |
| 5,706,097 | A | 1/1998 | Schelling et al. | 5,818,977 | A | 10/1998 | Tansley |
| 5,706,457 | A | 1/1998 | Dwyer et al. | 5,819,103 | A | 10/1998 | Endoh et al. |
| 5,708,810 | A | 1/1998 | Kern et al. | 5,821,997 | A | 10/1998 | Kawamura |
| 5,711,330 | A | 1/1998 | Nelson | 5,822,492 | A | 10/1998 | Wakui et al. |
| 5,719,967 | A | 2/1998 | Sekine | 5,822,581 | A | 10/1998 | Christeson |
| 5,719,978 | A | 2/1998 | Kakii et al. | 5,828,406 | A | 10/1998 | Parulski |
| 5,719,987 | A | 2/1998 | Kawamura | 5,828,793 | A | 10/1998 | Mann |
| 5,721,908 | A | 2/1998 | Lagarde | 5,831,590 | A | 11/1998 | Ikedo |
| 5,721,909 | A | 2/1998 | Oulid-Aissa et al. | 5,831,872 | A | 11/1998 | Pan |
| 5,724,070 | A | 3/1998 | Denninghoff et al. | 5,835,761 | A | 11/1998 | Ishii et al. |
| 5,724,475 | A | 3/1998 | Kirsten | 5,835,772 | A | 11/1998 | Thurlo |
| 5,724,579 | A | 3/1998 | Suzuki | 5,838,325 | A | 11/1998 | Deen et al. |
| 5,727,112 | A | 3/1998 | Kellar et al. | 5,841,422 | A | 11/1998 | Shyu |
| 5,727,159 | A | 3/1998 | Kikinis | 5,841,471 | A | 11/1998 | Endsley et al. |
| 5,729,289 | A | 3/1998 | Etoh | 5,845,166 | A | 12/1998 | Fellegara |
| 5,734,427 | A | 3/1998 | Hayashi | 5,847,706 | A | 12/1998 | Kingsley |
| 5,734,436 | A | 3/1998 | Abe | 5,848,193 | A | 12/1998 | Garcia |
| 5,734,915 | A | 3/1998 | Roewer | 5,848,420 | A | 12/1998 | Xu |
| 5,737,032 | A | 4/1998 | Stenzel | 5,850,483 | A | 12/1998 | Takabatake et al. |
| 5,737,476 | A | 4/1998 | Kim | 5,852,502 | A | 12/1998 | Beckett |
| 5,737,491 | A | 4/1998 | Allen et al. | 5,861,918 | A | 1/1999 | Anderson |
| 5,740,267 | A | 4/1998 | Echerer | 5,862,218 | A | 1/1999 | Steinberg |
| 5,740,801 | A | 4/1998 | Branson | 5,867,214 | A | 2/1999 | Anderson |
| 5,742,339 | A | 4/1998 | Wakui | 5,870,756 | A | 2/1999 | Nakata |
| 5,742,475 | A | 4/1998 | Riddiford | 5,873,007 | A | 2/1999 | Ferrada Suarez |
| 5,742,504 | A | 4/1998 | Meyer et al. | 5,874,959 | A | 2/1999 | Rowe |
| 5,742,659 | A | 4/1998 | Atac | 5,877,746 | A | 3/1999 | Parks et al. |
| 5,742,698 | A | 4/1998 | Minami et al. | 5,881,205 | A | 3/1999 | Andrew |
| 5,748,326 | A | 5/1998 | Thompson-Bell et al. | 5,883,610 | A | 3/1999 | Jeon |
| 5,748,831 | A | 5/1998 | Kubo | 5,892,511 | A | 4/1999 | Gelsinger et al. |
| 5,751,350 | A | 5/1998 | Tanaka | 5,892,847 | A | 4/1999 | Johnson |
| 5,752,244 | A | 5/1998 | Rose | 5,896,131 | A | 4/1999 | Alexander |
| 5,754,873 | A | 5/1998 | Nolan | 5,896,203 | A | 4/1999 | Shibata |
| 5,757,418 | A | 5/1998 | Inagaki | 5,898,434 | A | 4/1999 | Small et al. |
| 5,757,427 | A | 5/1998 | Miyaguchi | 5,898,779 | A | 4/1999 | Squilla et al. |
| 5,757,468 | A | 5/1998 | Patton et al. | 5,898,833 | A | 4/1999 | Kidder |
| 5,758,180 | A | 5/1998 | Duffy et al. | 5,900,909 | A | 5/1999 | Parulski et al. |
| 5,760,767 | A | 6/1998 | Shore et al. | 5,901,303 | A | 5/1999 | Chew |
| 5,761,655 | A | 6/1998 | Hoffman | 5,903,309 | A | 5/1999 | Anderson |
| 5,761,686 | A | 6/1998 | Bloomberg | 5,903,786 | A | 5/1999 | Goto |
| 5,764,276 | A | 6/1998 | Martin et al. | 5,907,315 | A | 5/1999 | Vlahos et al. |
| 5,764,291 | A | 6/1998 | Fullam | 5,910,805 | A | 6/1999 | Hickey |
| 5,767,897 | A | 6/1998 | Howell | 5,917,488 | A | 6/1999 | Anderson et al. |
| 5,767,904 | A | 6/1998 | Miyake | 5,920,726 | A | 7/1999 | Anderson |
| 5,769,713 | A | 6/1998 | Katayama | 5,926,208 | A | 7/1999 | Noonen et al. |
| 5,771,034 | A | 6/1998 | Gibson | 5,929,904 | A | 7/1999 | Uchida |
| 5,773,810 | A | 6/1998 | Hussey | 5,933,137 | A | 8/1999 | Anderson |
| 5,774,131 | A | 6/1998 | Kim | 5,937,106 | A | 8/1999 | Murayama |
| 5,781,175 | A | 7/1998 | Hara | 5,938,766 | A | 8/1999 | Anderson |
| 5,781,650 | A | 7/1998 | Lobo | 5,940,080 | A | 8/1999 | Ruehle |
| 5,781,798 | A | 7/1998 | Beatty et al. | 5,940,121 | A | 8/1999 | McIntyre |
| 5,784,177 | A | 7/1998 | Sanchez et al. | 5,943,050 | A | 8/1999 | Bullock et al. |
| 5,784,525 | A | 7/1998 | Bell | 5,943,093 | A | 8/1999 | Anderson et al. |
| 5,784,629 | A | 7/1998 | Anderson | 5,949,408 | A | 9/1999 | Kang et al. |
| 5,786,851 | A | 7/1998 | Kondo | 5,949,432 | A | 9/1999 | Gough et al. |
| D396,853 | S | 8/1998 | Cooper et al. | 5,949,474 | A | 9/1999 | Gerszberg et al. |
| 5,790,094 | A | 8/1998 | Tanigawa et al. | 5,949,496 | A | 9/1999 | Kim |
| 5,790,800 | A | 8/1998 | Gauvin et al. | 5,949,950 | A | 9/1999 | Kubo |
| 5,796,428 | A | 8/1998 | Matsumoto et al. | 5,956,084 | A | 9/1999 | Moronaga et al. |
| 5,796,875 | A | 8/1998 | Read | 5,963,670 | A | 10/1999 | Lipson et al. |
| 5,797,051 | A | 8/1998 | McIntyre | 5,966,122 | A | 10/1999 | Itoh |
| 5,801,685 | A | 9/1998 | Miller et al. | 5,969,718 | A | 10/1999 | Mills |
| 5,801,770 | A | 9/1998 | Paff et al. | 5,969,761 | A | 10/1999 | Takahashi et al. |
| 5,801,773 | A | 9/1998 | Ikeda | 5,973,691 | A | 10/1999 | Servan-Schreiber |
| 5,805,153 | A | 9/1998 | Nielsen | 5,973,694 | A | 10/1999 | Steele et al. |
| 5,805,163 | A | 9/1998 | Bagnas | 5,973,734 | A | 10/1999 | Anderson |
| 5,805,829 | A | 9/1998 | Cohen et al. | 5,974,386 | A | 10/1999 | Ejima et al. |
| 5,806,005 | A | 9/1998 | Hull | 5,977,975 | A | 11/1999 | Mugura et al. |
| 5,806,072 | A | 9/1998 | Kuba et al. | 5,977,976 | A | 11/1999 | Maeda |
| 5,815,160 | A | 9/1998 | Kikuchi | 5,977,985 | A | 11/1999 | Ishii |

| | | | | | | |
|---|---|---|---|---|---|---|
| 5,978,016 | A | 11/1999 | Lourette et al. | 6,169,725 B1 | 1/2001 | Gibbs et al. |
| 5,978,020 | A | 11/1999 | Watanabe et al. | 6,175,663 B1 | 1/2001 | Huang |
| 5,978,607 | A | 11/1999 | Teremy | 6,177,956 B1 | 1/2001 | Anderson et al. |
| 5,982,350 | A | 11/1999 | Hekmatpour et al. | 6,177,957 B1 | 1/2001 | Anderson |
| 5,982,429 | A | 11/1999 | Kamamoto et al. | 6,188,431 B1 | 2/2001 | Oie |
| 5,983,297 | A | 11/1999 | Noble et al. | 6,188,432 B1 | 2/2001 | Ejima |
| 5,986,701 | A | 11/1999 | Anderson | 6,188,782 B1 | 2/2001 | Le Beux |
| 5,987,223 | A | 11/1999 | Narukawa et al. | 6,204,877 B1 | 3/2001 | Kiyokawa |
| 5,991,465 | A | 11/1999 | Anderson | 6,205,485 B1 | 3/2001 | Kikinis |
| 5,991,515 | A | 11/1999 | Fall et al. | 6,209,048 B1 | 3/2001 | Wolff |
| 5,993,137 | A | 11/1999 | Harr | 6,211,870 B1 | 4/2001 | Foster |
| 5,999,173 | A | 12/1999 | Ubillos | 6,215,523 B1 | 4/2001 | Anderson |
| 5,999,191 | A | 12/1999 | Frank et al. | 6,222,538 B1 | 4/2001 | Anderson |
| 5,999,207 | A | 12/1999 | Rodriguez et al. | 6,223,190 B1 | 4/2001 | Aihara et al. |
| 5,999,740 | A | 12/1999 | Rowley | 6,226,449 B1 | 5/2001 | Inoue et al. |
| 6,003,093 | A | 12/1999 | Kester | 6,229,566 B1 | 5/2001 | Matsumoto et al. |
| 6,005,613 | A | 12/1999 | Endsley et al. | 6,230,307 B1 | 5/2001 | Davis et al. |
| 6,005,618 | A | 12/1999 | Fukui | 6,233,015 B1 | 5/2001 | Miller |
| 6,006,039 | A | 12/1999 | Steinberg et al. | 6,237,010 B1 | 5/2001 | Hui |
| 6,009,336 | A | 12/1999 | Harris et al. | 6,239,794 B1 | 5/2001 | Yuen et al. |
| 6,011,585 | A | 1/2000 | Anderson | 6,239,837 B1 | 5/2001 | Yamada et al. |
| 6,011,926 | A | 1/2000 | Cockell | 6,246,430 B1 | 6/2001 | Peters |
| 6,012,088 | A | 1/2000 | Li et al. | 6,249,316 B1 | 6/2001 | Anderson |
| 6,015,093 | A | 1/2000 | Barrett | 6,256,063 B1 | 7/2001 | Saito et al. |
| 6,020,920 | A | 2/2000 | Anderson | 6,262,769 B1 | 7/2001 | Anderson |
| 6,020,982 | A | 2/2000 | Yamauchi et al. | 6,275,260 B1 | 8/2001 | Anderson |
| 6,022,315 | A | 2/2000 | Iliff | 6,278,447 B1 | 8/2001 | Anderson |
| 6,023,241 | A | 2/2000 | Clapper | 6,285,398 B1 | 9/2001 | Shinsky et al. |
| 6,023,697 | A | 2/2000 | Bates et al. | 6,292,218 B1 | 9/2001 | Parulski et al. |
| 6,025,827 | A | 2/2000 | Bullock et al. | RE37,431 E | 10/2001 | Lanier et al. |
| 6,028,603 | A | 2/2000 | Wang et al. | 6,300,950 B1 | 10/2001 | Clark et al. |
| 6,028,611 | A | 2/2000 | Anderson et al. | 6,304,851 B1 | 10/2001 | Kmack et al. |
| 6,031,964 | A | 2/2000 | Anderson | 6,307,544 B1 | 10/2001 | Harding |
| 6,035,323 | A | 3/2000 | Narayen et al. | 6,310,647 B1 | 10/2001 | Parulski et al. |
| 6,035,359 | A | 3/2000 | Enoki | 6,310,648 B1 | 10/2001 | Miller et al. |
| 6,037,972 | A | 3/2000 | Horiuchi et al. | 6,317,141 B1 | 11/2001 | Pavley |
| 6,038,545 | A | 3/2000 | Mandeberg et al. | 6,334,025 B1 | 12/2001 | Yamagami |
| 6,052,555 | A | 4/2000 | Ferguson | 6,353,848 B1 | 3/2002 | Morris |
| 6,052,692 | A | 4/2000 | Anderson | 6,356,281 B1 | 3/2002 | Isenman |
| 6,058,428 | A | 5/2000 | Wang et al. | 6,356,357 B1 | 3/2002 | Anderson |
| 6,072,479 | A | 6/2000 | Ogawa | 6,380,972 B1 | 4/2002 | Suga et al. |
| 6,072,480 | A | 6/2000 | Gorbet et al. | 6,400,375 B1 | 6/2002 | Okudaira |
| 6,072,489 | A | 6/2000 | Gough et al. | 6,400,471 B1 | 6/2002 | Kuo et al. |
| 6,075,905 | A | 6/2000 | Herman et al. | 6,426,771 B1 | 7/2002 | Kosugi |
| 6,078,005 | A | 6/2000 | Kurakake | 6,437,829 B1 | 8/2002 | Webb |
| 6,078,756 | A | 6/2000 | Squilla et al. | 6,441,854 B2 | 8/2002 | Fellegara et al. |
| 6,082,827 | A | 7/2000 | McFall | 6,441,927 B1 | 8/2002 | Dow et al. |
| 6,084,990 | A | 7/2000 | Suzuki et al. | 6,445,412 B1 | 9/2002 | Shiohara |
| 6,091,846 | A | 7/2000 | Lin et al. | 6,473,123 B1 | 10/2002 | Anderson |
| 6,091,956 | A | 7/2000 | Hollenberg | 6,483,602 B1 | 11/2002 | Haneda |
| 6,094,221 | A | 7/2000 | Andersion | 6,486,914 B1 | 11/2002 | Anderson |
| 6,097,389 | A | 8/2000 | Morris et al. | 6,493,028 B1 | 12/2002 | Anderson |
| 6,097,430 | A | 8/2000 | Komiya et al. | 6,504,575 B1 | 1/2003 | Ramirez et al. |
| 6,097,431 | A | 8/2000 | Anderson | 6,507,362 B1 | 1/2003 | Akerib |
| 6,111,604 | A | 8/2000 | Hashimoto | 6,512,548 B1 | 1/2003 | Anderson |
| 6,118,480 | A | 9/2000 | Anderson et al. | 6,515,704 B1 | 2/2003 | Sato |
| 6,122,003 | A | 9/2000 | Anderson | 6,532,039 B2 | 3/2003 | Anderson |
| 6,122,005 | A | 9/2000 | Sasaki | 6,536,357 B1 | 3/2003 | Hiestand |
| 6,122,409 | A | 9/2000 | Boggs et al. | 6,538,698 B1 | 3/2003 | Anderson |
| 6,128,013 | A | 10/2000 | Prabhu | 6,563,535 B1 | 5/2003 | Anderson |
| 6,128,413 | A | 10/2000 | Benamara | 6,563,542 B1 | 5/2003 | Hatakenaka et al. |
| 6,137,468 | A | 10/2000 | Martinez | 6,567,122 B1 | 5/2003 | Anderson et al. |
| 6,137,534 | A | 10/2000 | Anderson | 6,571,271 B1 | 5/2003 | Savitzky et al. |
| 6,141,044 | A | 10/2000 | Anderson | 6,682,207 B2 | 1/2004 | Weber et al. |
| 6,144,362 | A | 11/2000 | Kawai | 6,683,649 B1 | 1/2004 | Anderson |
| 6,147,703 | A | 11/2000 | Miller | 6,738,075 B1 | 5/2004 | Torres |
| 6,147,709 | A | 11/2000 | Martin et al. | 6,747,692 B2 | 6/2004 | Patel et al. |
| 6,157,394 | A | 12/2000 | Anderson | 6,765,612 B1 | 7/2004 | Anderson et al. |
| 6,161,131 | A | 12/2000 | Garfinkle | 6,779,153 B1 | 8/2004 | Kagle |
| 6,167,469 | A | 12/2000 | Safai | 6,803,945 B1 | 10/2004 | Needham |
| 6,169,575 | B1 | 1/2001 | Anderson | 6,806,906 B1 | 10/2004 | Soga et al. |

| | | | |
|---|---|---|---|
| 6,897,891 | B2 | 5/2005 | Itsukaichi |
| 6,965,400 | B1 | 11/2005 | Haba et al. |
| 7,050,143 | B1 | 5/2006 | Silverbrook |
| 7,215,371 | B2 | 5/2007 | Fellegara et al. |
| 7,337,403 | B2 | 2/2008 | Pavley |
| 2001/0010543 | A1 | 8/2001 | Ward et al. |
| 2001/0012062 | A1 | 8/2001 | Anderson |
| 2001/0014910 | A1 | 8/2001 | Bobo |
| 2001/0014968 | A1 | 8/2001 | Mohammed |
| 2001/0049758 | A1 | 12/2001 | Shigetomi et al. |
| 2001/0050711 | A1 | 12/2001 | Karube et al. |
| 2002/0105582 | A1 | 8/2002 | Ikeda |
| 2002/0109782 | A1 | 8/2002 | Ejima |
| 2003/0169350 | A1 | 9/2003 | Wiezel |
| 2006/0174326 | A1 | 8/2006 | Ginter et al. |
| 2006/0200260 | A1 | 9/2006 | Hoffberg |
| 2007/0061594 | A1 | 3/2007 | Ginter et al. |

FOREIGN PATENT DOCUMENTS

| | | |
|---|---|---|
| EP | 0463856 A2 | 1/1992 |
| EP | 0519379 A2 | 6/1992 |
| EP | 0528084 A1 | 2/1993 |
| EP | 0555048 A2 | 8/1993 |
| EP | 0568468 A2 | 11/1993 |
| EP | 0617542 A2 | 9/1994 |
| EP | 0650125 A1 | 4/1995 |
| EP | 0661658 A2 | 7/1995 |
| EP | 0664475 A1 | 7/1995 |
| EP | 0664526 A2 | 7/1995 |
| EP | 0664527 A1 | 7/1995 |
| EP | 0729271 A2 | 8/1996 |
| EP | 0449106 B1 | 12/1996 |
| EP | 0817476 A2 | 1/1998 |
| EP | 0821522 A2 | 1/1998 |
| EP | 0835011 A1 | 4/1998 |
| EP | 0860735 A2 | 8/1998 |
| EP | 0860982 A2 | 8/1998 |
| EP | 0890919 A1 | 1/1999 |
| GB | 2245749 A | 1/1992 |
| GB | 2289555 A | 11/1995 |
| JP | 55-142470 A | 11/1980 |
| JP | 55-142471 | 11/1980 |
| JP | 62-271178 A | 11/1987 |
| JP | 1-132173 A | 5/1989 |
| JP | 1-238382 A | 9/1989 |
| JP | 1-319870 A | 12/1989 |
| JP | 2-42489 A | 2/1990 |
| JP | 2-162420 A | 6/1990 |
| JP | 2-257262 A | 10/1990 |
| JP | 2-280484 A | 11/1990 |
| JP | 3-117181 A | 5/1991 |
| JP | 3-231574 A | 10/1991 |
| JP | 3-246766 A | 11/1991 |
| JP | 3-506111 A | 12/1991 |
| JP | 4-115788 A | 4/1992 |
| JP | 4-120889 A | 4/1992 |
| JP | 4-230517 A | 8/1992 |
| JP | 4-302886 A | 10/1992 |
| JP | 4-506144 A | 10/1992 |
| JP | 4-372070 A | 12/1992 |
| JP | 5-14847 A | 1/1993 |
| JP | 5-91452 A | 4/1993 |
| JP | 5-108785 A | 4/1993 |
| JP | 5-115027 A | 5/1993 |
| JP | 5-131779 A | 5/1993 |
| JP | 5-150308 A | 6/1993 |
| JP | 5-207343 A | 8/1993 |
| JP | 5-260351 A | 10/1993 |
| JP | 5-289838 A | 11/1993 |
| JP | 5-290143 A | 11/1993 |
| JP | 5-308617 A | 11/1993 |
| JP | 5-314093 A | 11/1993 |
| JP | 6-57612 A | 3/1994 |
| JP | 6-60078 A | 3/1994 |
| JP | 6-78260 A | 3/1994 |
| JP | 6-103352 A | 4/1994 |
| JP | 6-105266 A | 4/1994 |
| JP | 6-178261 A | 6/1994 |
| JP | 6-197299 A | 7/1994 |
| JP | 6-265794 A | 9/1994 |
| JP | 6-290103 A | 10/1994 |
| JP | 6-348467 A | 12/1994 |
| JP | 6-350949 A | 12/1994 |
| JP | 7-6028 A | 1/1995 |
| JP | 7-160842 A | 6/1995 |
| JP | 7-168852 A | 7/1995 |
| JP | 7-184160 A | 7/1995 |
| JP | 7-221911 A | 8/1995 |
| JP | 7-245723 A | 9/1995 |
| JP | 7-274060 A | 10/1995 |
| JP | 7-274108 A | 10/1995 |
| JP | 7-295873 A | 11/1995 |
| JP | 8-32847 A | 2/1996 |
| JP | 8-502840 A | 3/1996 |
| JP | 8-111845 A | 4/1996 |
| JP | 8-114849 A | 5/1996 |
| JP | 8-116476 A | 5/1996 |
| JP | 8-140025 A | 5/1996 |
| JP | 8-147952 A | 6/1996 |
| JP | 8-205014 A | 8/1996 |
| JP | 8-223524 A | 8/1996 |
| JP | 8-249450 A | 9/1996 |
| JP | 8-279034 A | 10/1996 |
| JP | 8-331495 A | 12/1996 |
| JP | 8-339297 A | 12/1996 |
| JP | 9-27939 A | 1/1997 |
| JP | 9-37139 A | 2/1997 |
| JP | 9-163275 A | 6/1997 |
| JP | 9-171213 A | 6/1997 |
| JP | 9-311850 A | 12/1997 |
| JP | 10-4535 A | 1/1998 |
| JP | 10-162020 A | 6/1998 |
| JP | 10-243331 A | 9/1998 |
| JP | 2000-92439 A | 3/2000 |
| JP | 2000-510616 A | 8/2000 |
| JP | 2000-287110 A | 10/2000 |
| JP | 2001-501416 A | 1/2001 |
| WO | WO-91/14334 A1 | 9/1991 |
| WO | WO-92/05652 A2 | 4/1992 |
| WO | WO-92/05655 A1 | 4/1992 |
| WO | WO-92/09169 A1 | 5/1992 |
| WO | WO-92/20186 A1 | 11/1992 |
| WO | WO-94/23375 A1 | 10/1994 |
| WO | WO-95/32583 A1 | 11/1995 |
| WO | WO-96/02106 A1 | 1/1996 |
| WO | WO-96/29818 A1 | 9/1996 |
| WO | WO-97/17669 A1 | 5/1997 |
| WO | WO-97/38510 A1 | 10/1997 |
| WO | WO-98/14887 A1 | 4/1998 |

OTHER PUBLICATIONS

Buderi, Robert, "Photos That Talk," *Upside Today*, Jan. 27, 1999, <http://www.upside.com/texis/mvm/story?id–3236b0cb860>.

*Sony Digital Still Camera DSC–F1 Operating Instructions*, pp. 1–6, 16–17, 22–25, and 57–58, published 1996.

"Laboratory Analysis—Data Link: The Future of Camera Technology," *Popular Photography*, Sep. 1993, p. 48.

"PCMCIA for PowerBook 500 Series Computers," *Apple-Facts Online*, 1994, <http://product.info.apple.com/product-info/factsheets/pcmcia.html>.

"YCC Color Space," Oct. 3, 2000, <http://www.aols.com/colorite/yccspace.html>.

"MM4850: Image: Representation," Nov. 4, 1996, <http://www.mcs.csueastbay.edu/~tebo/Classes/4850/Image/representation.html>.

"What Isn't Obvious in the Patent World," PATNEWS, Jan. 30, 1998, email correspondence.

*Laura Lemay's Guide to Sizzling Web Site Design*, Sans.net Publishing, Indianapolis, 1997, pp. 75–77.

"Digitella Technology Solutions Announces ScriptGenerator 1.0, Enabling Users to Easily Develop Software Scripts that Run on Digital Cameras," *PR Newswire*, Oct. 7, 1998.

Grimm, Leigh, "The Manipulation Proclamation," *Photo Trade News*, Feb. 1997, p. 66.

"Kodak DC3400 Zoom—Distinctive New Kodak DC3400 Zoom Digital Camera Offers Easy–to–Use Features, Stylish New Look All at Affordable Price," *Kodak Press Release*, Aug. 1, 2000.

Hauf et al., "The FlashPix™ Image File Format," *The Fourth Color Imaging Conference: Color Science, Systems and Applications*, 1996, pp. 234–238.

Watanabe et al., "An Image Data File Format for Digital Still Camera," *IS&T's 48th Annual Conference Proceedings*, May 1995, vol. 48, pp. 421–424.

"Disk Drive with Embedded Hyper–Text Markup Language Server," *IBM Technical Disclosure Bulletin*, vol. 38, No. 12, Dec. 1995, p. 479.

"Phaser® 740L Color–Capable Laser Printer," printed Apr. 15, 1999, <http://www.tek.com/Color_Printers/products/740L/740Lfe.htm>.

"What is PhaserLink Software?," printed Apr. 15, 1999, <http://www.tek.com/Color_Printers/userdoc/PShare3/phlink1.htm>.

Corcoran et al., "A Portable Java API Interface to Simplify User Access to Digital Cameras,"*IEEE Transactions on Consumer Electronics*, vol. 44, No. 3, Aug. 1998, pp. 686–691.

Mann, Steve, "Headmounted Wireless Video: Computer–Supported Collaboration for Photojournalism and Everyday Use," *IEEE Communications Magazine*, vol. 36, No. 6, Jun. 1998, pp. 144–151.

Williams, Martyn, "Review—NEC PC–DC401 Digital Still Camera," *AppleLink Newbytes*, Mar. 15, 1996.

Peisel, Bill, "Designing the Next Step in Internet Appliances," *Electronic Design*, Mar. 23, 1998, pp. 50, 52, and 56.

Steinfield, Edward, "Leveraging Browsers as Universal GUIs," *EE Times*, Issue 932, Dec. 16, 1996, 4 pages.

Newby, Kris, "Apple's New Image–Capture Platform," *Apple Directions*, Aug. 1996.

"Device Drivers via the Access Bus," *IBM Technical Disclosure Bulletin*, vol. 39, No. 1, Jan. 1996, pp. 135–136.

Degann et al., "Still Images Retrieval from a Remote Database: The System Imagine," *Signal Processing: Image Communication*, vol. 5, No. 3, May 1993, pp. 219–234.

"Getting Started With Your Macintosh LC III," cover and inside cover page, p. 21, 1992.

"User's Guide Microsoft Windows & MS–DOS 6," Microsoft Corporation, pp. iii and 71–75, 1993.

Ide, K., "Color Zaurus," Soft Bank KK, Japan, Aug. 15, 1996, pp. 1–111.

Kodak Professional Digital Camera System (DSC100) User's Manual, Eastman Kodak Company, 1991–1992.

Nikon Digital Camera E100 brochure, Nikon Corporation, Electronic Imaging Division, Sep. 1996.

Canon PowerShot 600 Digital Camera brochure, Canon Computer Systems, Inc., 1996.

Canon PowerShot 350 Digital Camera brochure, Canon Computer Systems, Inc., 1997.

Fujix Digital Card Camera DS–220 brochure, Fuji Photo Film Co., Ltd., 1995.

Epson PhotoPC 500 Color Digital Camera brochure, Seiko Epson Corporation, Oct. 3, 1995.

Okachi et al., "Clear! Simple! Upgraded Digital Photography," *Nikkei Personal Computing*, Nikkei Business publications, Inc., Japan, Aug. 26, 1996, vol. 271, pp. 236–264.

Kurzidim, "Bildersafari: Foto–Und Videodatenbanken von 100 bis 100000 OM", vol. 9, 1994, pp. 112–114, 116–117, 120–121.

Aker et al., *The Macintosh Bible*, Third Edition, Nov. 1991, pp. 63–64, 324, 931, 945, Goldstein & Blair, Berkeley, California.

*Liquid Crystal Digital Camera QV–10B Owner's Manual*, Casio, 1995, pp. 1–89, Casio Computer Co., ltd.

Foley et al., *Introduction to Computer Graphics*, 1994, 1990, pp. 505–509, Addison–Wesley Publishing Company, Inc.

Foley et al., *Computer Graphics—Principles and Practice, Second Edition*, Jun. 15, 1990, pp. 754–759, Addison–Wesley Publication Company, Inc.

*Inside Macintosh*, Apple Computer, 1993, pp. 1–5 to 1–8 and 4–1 to 4–46, Apple Computer Inc., Cupertino, California.

Kroiak et al., "A Declaration of Device Independence," *ESD: The Electronic System Design Magazine*, May 1988, pp. 63–65, vol. 18, No. 5.

Melville et al., "An Application Programmer's Interface for Digital Cameras," *Imaging Science and Technology's 49$^{th}$ Annual Conference*, May 19–24, 1996, The Society for Imaging Science and Technology.

*Picona PC–DC200 PC–DC200K User's Manual*, Feb. 1997, NEC Corporation.

Posnak et al., "An Adaptive Framework for Developing Multimedia Software Components," *Communications of the ACM*, Oct. 1997, pp. 43–47, vol. 40, No. 10, ACM.

*Ricoh Digital Camera RDC–1 Instruction Manual*, Ricoh, Ricoh Americas Corp., Ricoh Co., Ltd Japan.

Shimizu et al., "The Digital Camera Using New Compression and Interpolation Algorithm," IS&T 49$^{th}$ Annual Conference, May 19–24, 1996, pp. 268–272, IS&T, Springfield, Virginia.

Skelton et al., "Design and Development of a Transportable Image Processing and GIS System," *Infrared Image Processing and Enhancement*, May 20–21, 1987, pp. 187–191, vol. 781, SPIE, Bellingham, Washington.

*Texas Instruments TI–85 Guidebook*, 1993, Texas Instruments Incorporated.

*Texas Instruments TI–92 Guidebook*, 1995, Texas Instruments Incorporated.

*VxWorks Programmer's Guide*, 1984–1999, Wind River Systems, Inc.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-11, 22-24 and 26-29 is confirmed.

Claim 13 is determined to be patentable as amended.

Claims 14-20, dependent on an amended claim, is determined to be patentable.

New claims 31-71 are added and determined to be patentable.

Claims 12, 21, 25 and 30 were not reexamined.

13. A method for processing image data in a digital image device, said method comprising the steps of:
   a) creating a data structure corresponding to an image processing mode used by an image processing subsystem of said digital image device;
   b) initializing said image processing subsystem and said data structure;
   c) forwarding said image data to said data structure;
   d) processing said image data using said processing mode used by said image processing subsystem; and
   e) writing said image data to a data storage element, *wherein said data structure provides an interface between said image processing subsystem and an operating system of the digital image device, such that said operating system is independent of said image processing mode and said processing mode defines an architecture type of said image processing subsystem and wherein the image processing subsystem is a first image processing subsystem and is interchangeable with a second image processing subsystem, which has a different type of architecture than the first image processing subsystem.*

*31. The system of claim 1 wherein said processing mode defines an architecture type of said image processing subsystem.*

*32. The system of claim 31 wherein said processing mode is a software architecture.*

*33. The system of claim 32 wherein said software architecture comprises a plurality of processing modules and a Joint Photographic Experts Group (JPEG) software element.*

*34. The system of claim 31 wherein said processing mode is a combined software and hardware architecture.*

*35. The system of claim 34, wherein said combined software and hardware architecture comprises a digital signal processor and a Joint Photographic Experts Group (JPEG) hardware element.*

*36. The system of claim 31 wherein said processing mode is a hardware architecture.*

*37. The system of claim 36 wherein said hardware architecture comprises an image processing hardware system.*

*38. The system of claim 31 wherein said operating system manages said image processing subsystem via said interface provided by said data structure.*

*39. The system of claim 38 wherein to manage said image processing subsystem, said operating system is further adapted to initialize said image processing subsystem.*

*40. The system of claim 31 wherein said operating system is further configured to initialize said data structure prior to said image processing.*

*41. The system of claim 31 wherein said operating system is further configured to provide a menu-driven graphical user interface that allows a user to control operation of said digital image device.*

*42. The system of claim 31 wherein said data structure provides a common point for entering and exiting said image processing subsystem without changing upstream and downstream elements of said image processing subsystem.*

*43. The system of claim 31 wherein said data structure provides a common point at which said image processing subsystem taps into a data path of the digital image device without changing said data path.*

*44. The method of claim 13 further comprising managing said image processing subsystem via said interface using said operating system.*

*45. The method of claim 44 further comprising managing said image data in said data structure during said processing of said image data.*

*46. The method of claim 13 further comprising managing said image data in said data structure during the processing of said image data.*

*47. The method of claim 13 further comprising:*
   *managing said image processing subsystem via said interface using said operating system; and*
   *managing said image data in said data structure during said processing of said image data.*

*48. The method of claim 13 wherein said processing mode is a software architecture.*

*49. The method of claim 48 wherein said software architecture comprises a plurality of processing modules and a Joint Photographic Experts Group (JPEG) software element.*

*50. The method of claim 13 wherein said processing mode is a combined software and hardware architecture.*

*51. The method of claim 50 wherein said combined software and hardware architecture comprises a digital signal processor and a JPEG hardware element.*

*52. The method of claim 13 wherein said processing mode is a hardware architecture.*

*53. The method of claim 52 wherein said hardware architecture comprises an image processing hardware system.*

*54. The method of claim 13 further comprising using said operating system to provide a menu-driven graphical user interface that allows a user to control operation of said digital image device.*

*55. The method of claim 13 wherein said data structure provides a common point for entering and exiting said image processing subsystem without changing upstream and downstream elements of said image processing subsystem.*

*56. The method of claim 13 wherein said data structure provides a common point at which said image processing subsystem taps into a data path of the digital image device without changing the data path.*

*57. The system of claim 31 wherein the image processing subsystem is a first image processing subsystem and is interchangeable with a second image processing subsystem,* which has an architecture different than the first image processing subsystem.

58. The system of claim 57 wherein the first image processing subsystem has a first architecture and the second image processing subsystem has a second architecture, and wherein the first architecture is of a type comprising one of software, hardware, or a combination of hardware and software and the second architecture is another of a type comprising one of software, hardware, or a combination of hardware and software.

59. The system of claim 31 wherein the image procesing subsystem is a first image processing subsystem and is interchangeable with a second image processing subsystem, which has a different type of architecture than the first image processing subsystem.

60. The system of claim 22 wherein said processing mode defines an architecture type of said image processing subsystem.

61. The system of claim 60 wherein said processing mode is a software architecture.

62. The system of claim 60 wherein said processing mode is a combined software and hardware architecture.

63. The system of claim 60 wherein said processing mode is a hardware architecture.

64. The system of claim 60 wherein said operating system manages said image processing subsystem via the interface provided by the data structure.

65. The system of claim 64 wherein to manage said image processing subsystem, said operating system is further adapted to initialize said image processing subsystem.

66. The system of claim 60 wherein said operating system is further configured to initialize said data structure prior to said image processing.

67. The system of claim 60 wherein said operating system is further configured to provide a menu-driven graphical user interface that allows a user to control operation of said digital image device.

68. The system of claim 60 wherein said data structure provides a common point for entering and exiting said image processing subsystem without changing upstream and downstream elements of said image processing subsystem.

69. The system of claim 60 wherein said data structure provides a common point at which said image processing subsystem taps into a data path of the digital image device without changing said data path.

70. The system of claim 60 wherein the image processing subsystem is a first image processing subsystem and is interchangeable with a second image processing subsystem, which has an architecture different than the first image processing subsystem.

71. The system of claim 70 wherein the first image processing subsystem has a first architecture and the second image processing subsystem has a second architecture, and wherein the first architecture is of a type comprising one of software, hardware, or a combination of hardware and software, and the second architecture is another of a type comprising one of software, hardware, or a combination of hardware and software.

* * * * *

US006400471C2

(12) EX PARTE REEXAMINATION CERTIFICATE (9394th)
United States Patent
Kuo et al.

(10) Number: US 6,400,471 C2
(45) Certificate Issued: Nov. 2, 2012

(54) FLEXIBLE ARCHITECTURE FOR IMAGE PROCESSING

(75) Inventors: David Kuo, San Jose, CA (US); Eric Anderson, San Jose, CA (US)

(73) Assignee: Flashpoint Technology, Inc., San Jose, CA (US)

Reexamination Request:
No. 90/012,246, Apr. 9, 2012

Reexamination Certificate for:
Patent No.: 6,400,471
Issued: Jun. 4, 2002
Appl. No.: 09/249,741
Filed: Feb. 11, 1999

Reexamination Certificate C1 6,400,471 issued Jul. 19, 2011

Certificate of Correction issued Sep. 27, 2011.

(51) Int. Cl.
*H04N 1/21* (2006.01)
(52) U.S. Cl. ............. 358/468; 358/442; 348/231.1
(58) Field of Classification Search ............ None
See application file for complete search history.

(56) References Cited

To view the complete listing of prior art documents cited during the proceeding for Reexamination Control Number 90/012,246, please refer to the USPTO's public Patent Application Information Retrieval (PAIR) system under the Display References tab.

*Primary Examiner* — Woo H Choi

(57) ABSTRACT

A system and a method for processing image data in a digital image device such as a digital camera. The present invention includes a bus, a central processing unit coupled to the bus, an image processing subsystem coupled to the central processing unit for processing the image data using a particular processing mode, a memory unit coupled to the bus, and a data storage element for storing the image data after image processing. The memory unit has stored therein an operating system for managing the image processing subsystem, and the memory unit also has a data structure for managing the image data for the image processing subsystem during image processing. The data structure provides an interface between the operating system and the image processing subsystem, such that the operating system is independent of the processing mode used by the image processing subsystem.

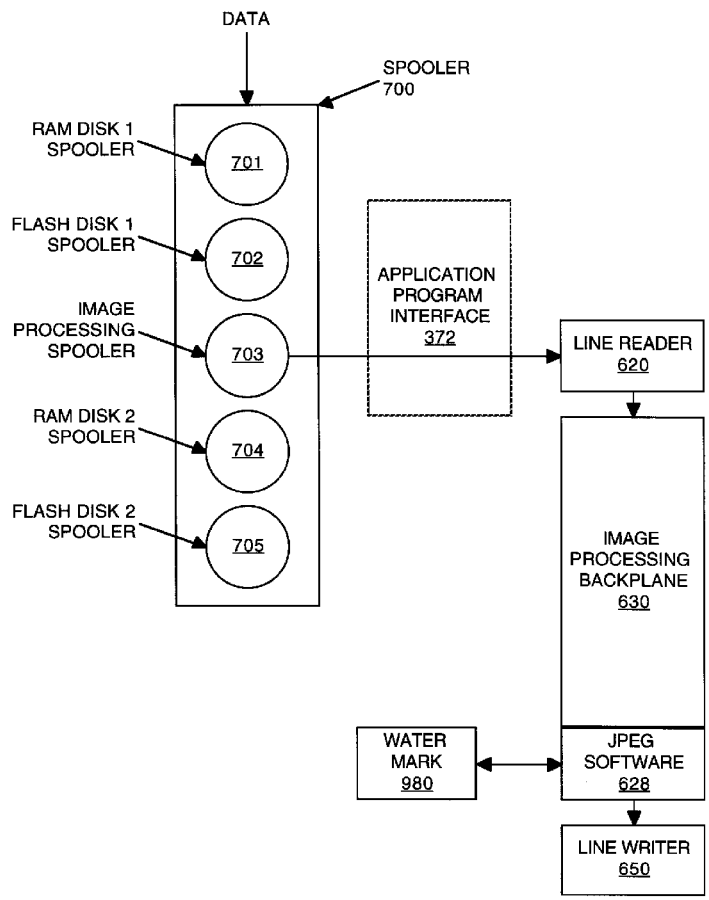

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-71 is confirmed.

* * * * *